US012239599B2

(12) United States Patent
Kawamura et al.

(10) Patent No.: US 12,239,599 B2
(45) Date of Patent: Mar. 4, 2025

(54) MOVEMENT ASSISTANCE APPARATUS AND MOVEMENT ASSISTANCE SYSTEM

(71) Applicant: TOYOTA JIDOSHA KABUSHIKI KAISHA, Aichi-ken (JP)

(72) Inventors: Hiroaki Kawamura, Nagoya (JP); Mashio Taniguchi, Toyota (JP); Naoya Hashidate, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 284 days.

(21) Appl. No.: 18/151,471

(22) Filed: Jan. 9, 2023

(65) Prior Publication Data

US 2023/0248605 A1 Aug. 10, 2023

(30) Foreign Application Priority Data

Feb. 9, 2022 (JP) ................................. 2022-018933

(51) Int. Cl.
*A61H 3/06* (2006.01)

(52) U.S. Cl.
CPC ............. *A61H 3/061* (2013.01); *A61H 3/068* (2013.01); *A61H 2003/063* (2013.01); *A61H 2201/5064* (2013.01); *A61H 2201/5079* (2013.01); *A61H 2201/5084* (2013.01); *A61H 2201/5092* (2013.01)

(58) Field of Classification Search
CPC .. A61H 3/061; A61H 3/068; A61H 2003/063; A61H 2201/5064; A61H 2201/5079; A61H 2201/5084; A61H 2201/5092; A61H 2201/1635; A61H 2201/5007; A61H 2201/5048; A61H 2201/5097; A61H 2201/0153; A61H 2201/0157; A61H 2201/0184; A61H 2201/1207; A61H 2201/501; A61H 2201/5023; A61H 2201/5025; A61H 2201/5058; A61H 3/06; G01H 17/00; G01R 19/165; H02J 7/0029; H02J 7/0063;

(Continued)

(56) References Cited

U.S. PATENT DOCUMENTS 10,265,196 B2 * 4/2019 Ha ......................... A61H 31/00
10,404,950 B2 9/2019 Mali et al.

(Continued)

FOREIGN PATENT DOCUMENTS

CN 113545968 A 10/2021
JP 2008191815 A 8/2008

(Continued)

*Primary Examiner* — Nam V Nguyen
(74) *Attorney, Agent, or Firm* — HAUPTMAN HAM, LLP

(57) ABSTRACT

A movement assistance apparatus to be provided in a movement assistance device and configured to execute a movement assistance operation for assisting movement of a user includes a mode switching control unit configured to switch, based on a magnitude of a surrounding risk on the movement of the user, a power mode between a normal mode in which the movement assistance operation is executable and a power saving mode in which a power consumption is smaller than a power consumption in the normal mode. A condition for setting the power mode to the power saving mode includes a condition that the surrounding risk satisfies a predetermined low-risk condition.

18 Claims, 18 Drawing Sheets

(58) Field of Classification Search
CPC .. H02J 7/32; A45B 3/00; G08G 1/005; H04N 7/18; G06N 20/00
USPC ........................................................ 340/5.1
See application file for complete search history.

(56) References Cited

U.S. PATENT DOCUMENTS

| | | | | |
|---|---|---|---|---|
| 11,626,001 | B1 * | 4/2023 | Khmelev | G08B 21/12 340/532 |
| 2006/0129308 | A1 | 6/2006 | Kates | |
| 2016/0084952 | A1 | 3/2016 | Karlapalem | |
| 2018/0137749 | A1 | 5/2018 | Varga | |
| 2021/0336481 | A1 | 10/2021 | Sung et al. | |
| 2021/0338517 | A1 | 11/2021 | Taniguchi et al. | |

FOREIGN PATENT DOCUMENTS

| | | | |
|---|---|---|---|
| JP | 2009-116753 | A | 5/2009 |
| JP | 2015-022699 | A | 2/2015 |
| JP | 2016-100885 | A | 5/2016 |
| JP | 2021133700 | A | 9/2021 |
| JP | 2021174467 | A | 11/2021 |
| KR | 10-1458340 | B1 | 11/2014 |
| WO | 2016/196483 | A1 | 12/2016 |
| WO | 2020/012180 | A2 | 1/2020 |

* cited by examiner

| INFORMATION ATTRIBUTE | URGENCY LEVEL | IMPORTANCE LEVEL |
|---|---|---|
| INFO.1 | LOW | MEDIUM |
| INFO.2 | LOW | HIGH |
| INFO.3 | MEDIUM | MEDIUM |
| ⋮ | ⋮ | ⋮ |
| INFO.N | HIGH | HIGH |

MOVEMENT ASSISTANCE APPARATUS AND MOVEMENT ASSISTANCE SYSTEM

CROSS-REFERENCE TO RELATED APPLICATION

This application claims priority to Japanese Patent Application No. 2022-018933 filed on Feb. 9, 2022, incorporated herein by reference in its entirety.

BACKGROUND

1. Technical Field

The present disclosure relates to a movement assistance apparatus and a movement assistance system for assisting movement of a user (for example, walking of a visually impaired person). In particular, the present disclosure relates to measures for power saving of the movement assistance apparatus.

2. Description of Related Art

As a movement assistance apparatus for assisting walking of a pedestrian such as a visually impaired person (assisting movement of a user), a movement assistance apparatus disclosed in Japanese Unexamined Patent Application Publication No. 2021-174467 (JP 2021-174467 A) is known. JP 2021-174467 A discloses that information about movement of a moving object (vehicle etc.) present in the vicinity is received and a user (visually impaired person) taking action without using vision is notified about movement assistance based on the received information. Specifically, a notification function for avoiding collision with a moving object is as follows. Communication is made with a moving object present around a movement assistance device (white cane) gripped by the user to acquire a current position, a moving direction, and a moving speed of the moving object. A future movement trajectory of the moving object and a future movement trajectory of the user are predicted. When the probability of collision between the moving object and the user is equal to or higher than a predetermined value, the user is notified about the possibility of collision with the moving object by voice or sound from the movement assistance device or vibration of the movement assistance device.

SUMMARY

However, the movement assistance apparatus uniformly consumes electric power to recognize the surrounding environment regardless of the magnitude of a surrounding risk on the movement of the user (for example, approach of a vehicle). Therefore, the power consumption is large and the period that elapses before exhaustion of the remaining power storage amount of a battery is relatively short. When the remaining power storage amount of the battery is exhausted, the movement assistance apparatus cannot perform the operation described above (movement assistance operation such as notification for avoiding collision with a moving object).

By increasing the size of the battery to be mounted, it is possible to continuously exert the function over a long period. In this case, however, the size and weight of the battery increase, which leads to a lack of practicality. Power saving can be achieved and the battery can be downsized when the user switches the power supply of the movement assistance apparatus ON and OFF as necessary. However, the power ON/OFF operation is cumbersome and the function cannot be exerted when the power ON operation is neglected. Thus, the function cannot reliably be exerted at appropriate timings.

The present disclosure provides a movement assistance apparatus and a movement assistance system that enhance practicality in power saving.

A movement assistance apparatus according to a first aspect of the present disclosure is a movement assistance apparatus to be provided in a movement assistance device and configured to execute a movement assistance operation for assisting movement of a user. The movement assistance apparatus includes a mode switching control unit configured to switch, based on a magnitude of a surrounding risk on the movement of the user, a power mode between a normal mode in which the movement assistance operation is executable and a power saving mode in which a power consumption is smaller than a power consumption in the normal mode. A condition for setting the power mode to the power saving mode includes a condition that the surrounding risk satisfies a predetermined low-risk condition.

The phrase "a power consumption is smaller than a power consumption in the normal mode" may be a concept including a case where the power consumption is zero.

When the surrounding risk on the movement of the user is relatively high (does not satisfy the predetermined low-risk condition), the mode switching control unit may set the power mode of the movement assistance apparatus to the normal mode under that condition, thereby enabling the movement assistance operation for assisting the movement of the user. When the surrounding risk on the movement of the user is relatively low and satisfies the predetermined low-risk condition, the power mode of the movement assistance apparatus may set to the power saving mode and the electric power consumed by the movement assistance apparatus may be zero under satisfaction of a predetermined condition including the condition that the surrounding risk satisfies the predetermined low-risk condition (including a case of only the condition that the surrounding risk satisfies the predetermined low-risk condition). Alternatively, the electric power consumed by the movement assistance apparatus may be reduced. Thus, the power mode may be set to the normal mode as necessary so that the movement assistance operation can be executed, and the power mode may be set to the power saving mode when the movement assistance operation is not necessary, thereby reducing the power consumption of the movement assistance apparatus. As a result, the function of the movement assistance apparatus (function of performing the movement assistance operation at appropriate timings) may be exerted continuously over a long period without the need to mount a large-size battery, thereby enhancing the practicality in the power saving of the movement assistance apparatus.

The movement assistance apparatus according to the first aspect of the present disclosure may further include a risk index acquisition unit configured to acquire a risk index correlated to the magnitude of the surrounding risk on the movement of the user. The surrounding risk may satisfy the predetermined low-risk condition when the risk index acquired by the risk index acquisition unit is equal to or smaller than a predetermined threshold.

When the risk index is larger than the predetermined threshold, it may be assumed that the surrounding risk on the movement of the user is relatively high. Under the condition that the risk index is larger than the predetermined threshold, the mode switching control unit may set the power mode of the movement assistance apparatus to the normal mode, thereby enabling the movement assistance operation for assisting the movement of the user. When the risk index is equal to or smaller than the predetermined threshold, it may be assumed that the surrounding risk on the movement of the user is relatively low. Under satisfaction of a predetermined condition including the condition that the risk index is equal to or smaller than the predetermined threshold, the power mode of the movement assistance apparatus may be set to the power saving mode and the electric power consumed by the movement assistance apparatus may be zero. Alternatively, the electric power consumed by the movement assistance apparatus may be reduced. In this case as well, the power mode may be set to the normal mode as necessary so that the movement assistance operation can be executed, and the power mode may be set to the power saving mode when the movement assistance operation is not necessary, thereby reducing the power consumption of the movement assistance apparatus. By switching the power mode based on the comparison between the risk index and the predetermined threshold, it may be possible to easily set the condition for switching the power mode.

In the movement assistance apparatus according to the first aspect of the present disclosure, the surrounding risk may be related to approaches of one or more vehicles to the user. The risk index acquisition unit may include one or more resonance devices configured to resonate with sounds emitted by the one or more vehicles approaching the user, one or more power generation devices configured to generate electric power along with resonances of the one or more resonance devices, and one or more detection devices configured to detect physical quantities related to power generations of the one or more power generation devices. The surrounding risk may satisfy the predetermined low-risk condition when each of the physical quantities detected by the one or more detection devices is equal to or smaller than a predetermined threshold. The each of the physical quantities may corresponding to the risk index.

The user may recognize that the vehicle is approaching the user and the surrounding risk on the movement of the user increases by using the operation of resonance of the resonance device with the sound emitted by the vehicle (including a sound generated as the vehicle travels). That is, the resonance device may resonate with the sound emitted by the vehicle approaching the user, and the power generation device may generate electric power by using the vibration (resonance). When the detection device detects the physical quantity related to the power generation (current value, voltage value, etc.) and the detected physical quantity is larger than the predetermined threshold, the mode switching control unit may set the power mode of the movement assistance apparatus to the normal mode under the condition that the detected physical quantity is larger than the predetermined threshold, thereby enabling the movement assistance operation for assisting the movement of the user. That is, the movement assistance operation may be performed in conjunction with the approach of the vehicle to the user. When the physical quantity is equal to or smaller than the predetermined threshold (including a case where the physical quantity is zero), the power mode of the movement assistance apparatus may be set to the power saving mode and the electric power consumed by the movement assistance apparatus may be zero under satisfaction of a predetermined condition including the condition that the physical quantity is equal to or smaller than the predetermined threshold. Alternatively, the electric power consumed by the movement assistance apparatus may be reduced. Since the surrounding risk on the movement of the user can be recognized by using the sound emitted by the vehicle, the surrounding risk can be recognized without using electric power, thereby contributing also to the power saving of the movement assistance apparatus.

In the movement assistance apparatus according to the first aspect of the present disclosure, the sounds emitted by the one or more vehicles may include at least one of an approach notification sound, a siren sound of an emergency vehicle, or a traveling sound of a train.

Each sound may be a sound in a predetermined frequency band. The resonance device may be set to resonate with this sound (at least one of the approach notification sound, the siren sound of the emergency vehicle, and the traveling sound of the train). Therefore, it may be possible to suppress resonance of the resonance device with a sound other than the sound emitted by the vehicle (surrounding noise etc.), thereby accurately recognizing the surrounding risk such as the approach of the vehicle to the user. As a result, it may be possible to reduce the occurrence of a situation in which the power saving mode is terminated unnecessarily (the power saving mode is terminated because of resonance with surrounding noise or the like even though the vehicle is not approaching the user).

In the movement assistance apparatus according to the first aspect of the present disclosure, a resonance frequency of each of the one or more resonance devices may be set as a frequency higher than a frequency of the sound emitted by a corresponding one of the one or more vehicles by an amount corresponding to frequency shift due to a Doppler effect when the corresponding one of the one or more vehicles approaches the user.

According to this configuration, only when the vehicle is approaching the user, the resonance device may resonate with the sound arriving from the vehicle (sound shifted to a high-frequency side by the Doppler effect), and the power generation device may generate electric power. That is, in a situation in which the vehicle is moving away from the user, the resonance device may not resonate with the sound arriving from the vehicle and the power generation device may not generate electric power. Therefore, in the situation in which the vehicle is moving away from the user and the surrounding risk on the movement of the user is low, the risk index may be equal to or smaller than the predetermined threshold, and the power mode may be set to the power saving mode. By setting the resonance frequency of the resonance device in consideration of the Doppler effect, it may be possible to increase the accuracy of recognition of the surrounding risk on the movement of the user, and reduce the occurrence of a situation in which the power saving mode is terminated even though the vehicle is moving away from the user, thereby contributing further to the power saving of the movement assistance apparatus.

In the movement assistance apparatus according to the first aspect of the present disclosure, the movement assistance device may include a grip portion to be gripped by the user. A plurality of the resonance devices may be arranged at a plurality of positions in the grip portion, and resonance frequencies of the resonance devices may individually be set based on frequencies of sounds of the vehicles that emit the sounds at different frequencies.

According to this configuration, the user may grasp in advance the relationships among the arrangement positions of the resonance devices, the sounds that resonate with the resonance devices (approach notification sound, siren sound, and traveling sound), and the types of the vehicles that emit the sounds (grasps in advance the arrangement position of the resonance device that resonates with the approach notification sound emitted by the vehicle such as an electrified vehicle, the arrangement position of the resonance device that resonates with the siren sound emitted by the emergency vehicle, and the arrangement position of the resonance device that resonates with the traveling sound of the train), thereby recognizing the resonating resonance device while gripping the grip portion of the movement assistance device. Thus, the user can know the type of the approaching vehicle (type of vehicle associated with the resonating sound). That is, the user can know the approach of the vehicle and the type of the vehicle even in a situation in which the user cannot see the vehicle or cannot hear the sound emitted by the vehicle.

In the movement assistance apparatus according to the first aspect of the present disclosure, the grip portion of the movement assistance device may include a plurality of contact areas where fingers of a hand of the user come into contact. The resonance devices may be arranged at positions corresponding to the contact areas different from each other.

According to this configuration, the user can easily recognize which resonance device is resonating by recognizing the finger to which vibration is transmitted by the resonance while gripping the grip portion of the movement assistance device. Thus, the user can easily know the type of the approaching vehicle.

The movement assistance apparatus according to the first aspect of the present disclosure may further include a plurality of switches arranged in association with arrangement positions of the resonance devices and configured to be pressed by the user, and a notification device configured to receive a press signal from at least one of the switches pressed by the user, identify the one or more vehicles approaching the user based on the at least one of the switches that has issued the press signal, and perform a user presence notification operation for the one or more vehicles.

According to this configuration, when the user who recognized that the vehicle was approaching the user by the resonance of any of the resonance devices becomes unable to recognize the vehicle for some reason, the user may press any of the switches arranged in association with the arrangement position of the resonating resonance device. At this time, the press signal may be output from the switch, and the notification device may receive the press signal. In this case, the switch that has output the press signal may be grasped, and therefore the vehicle that the user is unable to recognize may be identified. The notification device may perform the user presence notification operation for the vehicle (notification operation for notifying the vehicle about the presence of the user). Therefore, the driver of the vehicle approaching the user may recognize the presence of the user. Thus, the driver can be expected to perform a driving operation in consideration of the presence of the user. As a result, contact between the user and the vehicle can be avoided.

In the movement assistance apparatus according to the first aspect of the present disclosure, the magnitude of the surrounding risk on the movement of the user may be correlated to an urgency level that is based on a physical period that elapses before the user faces danger during the movement of the user. The danger user faces may be, for example, approaching a vehicle.

According to this configuration, when the urgency level is low and the surrounding risk satisfies the low-risk condition, the power mode of the movement assistance apparatus may be the power saving mode. When the urgency level increases and the surrounding risk does not satisfy the low-risk condition, the power mode of the movement assistance apparatus may be set to the normal mode and the movement assistance operation may be executed. In this case as well, the power mode may be set to the normal mode as necessary so that the movement assistance operation can be executed, and the power mode may be set to the power saving mode when the movement assistance operation is not necessary, thereby reducing the power consumption of the movement assistance apparatus.

In the movement assistance apparatus according to the first aspect of the present disclosure, the urgency level may be a level corrected, based on at least one of urgency level correction parameters during the movement of the user, from a reference urgency level associated with the physical period that elapses before the user faces the danger during the movement of the user.

According to this configuration, it may be possible to appropriately determine the urgency level depending on various situations during the movement of the user (such as the state of the user and the surrounding environment). Thus, it is possible to optimize the movement assistance operation to be provided to the user.

In the movement assistance apparatus according to the first aspect of the present disclosure, the urgency level correction parameters may include at least one of an agility of avoidance action of the user against an event that the user faces the danger during the movement of the user, an ease of avoidance action of the user depending on a surrounding environment against the event that the user faces the danger during the movement of the user, or a type of the danger during the movement of the user.

Even if the physical period that elapses before the user faces the risk on the movement (physical period to determine the reference urgency level) is the same, a user who is not agile about the avoidance action against the event that the user faces the risk has a stronger possibility of facing the risk than a user who is agile about the avoidance action. Therefore, in the case of the user who is not agile about the avoidance action, the urgency level may be regarded as being high even if the physical period is the same. In a surrounding environment with difficulty in the avoidance action against the event that the user faces the risk, there is a stronger possibility that the user faces the risk than in a surrounding environment with the ease of the avoidance action. Therefore, also in the case of the surrounding environment with the difficulty in the avoidance action, the urgency level may be regarded as being high. Depending on the type of the risk that the user faces, there is variation in the range in which approach cannot be permitted. For example, in a case where the user approaches a person, it is assumed that the range in which approach cannot be permitted is wider than in a case where the user approaches an object. That is, in a case where the risk that the user faces is an object, it is only necessary to consider the physical period that elapses before the user faces the risk. In a case where the risk that the user faces is a person, it is necessary to consider a time margin for securing a psychological personal space (psychological time margin) in addition to the physical period that elapses before the user faces the risk. Therefore, the urgency level may be regarded as being high in this case as well.

In view of the above, in the movement assistance apparatus according to the first aspect of the present disclosure, the urgency level may be determined by correcting the reference urgency level (urgency level associated with the physical period that elapses before the user faces the risk) based on at least one of the agility of the avoidance action of the user against the event that the user faces the risk on the movement, the ease of the avoidance action of the user depending on the surrounding environment against the event that the user faces the risk on the movement, and the type of the risk on the movement. Thus, it may be possible to further optimize the timing to switch the power mode of the movement assistance apparatus between the normal mode and the power saving mode.

In the movement assistance apparatus according to the first aspect of the present disclosure, the magnitude of the surrounding risk on the movement of the user may be correlated to an importance level that is a level of influence resulting from an event that the user faces danger during the movement of the user.

According to this configuration, when the importance level is low and the surrounding risk satisfies the predetermined low-risk condition, the power mode of the movement assistance apparatus may be the power saving mode. When the importance level is high and the surrounding risk does not satisfy the predetermined low-risk condition, the power mode of the movement assistance apparatus may be set to the normal mode and the movement assistance operation may be executed. In this case as well, the power mode may be set to the normal mode as necessary so that the movement assistance operation can be executed, and the power mode may be set to the power saving mode when the movement assistance operation is not necessary, thereby reducing the power consumption of the movement assistance apparatus.

In the movement assistance apparatus according to the first aspect of the present disclosure, whether the surrounding risk satisfies the predetermined low-risk condition may be determined based on at least one of user's periphery information acquired by an information acquisition device provided in the movement assistance apparatus, information received from an external device by the movement assistance apparatus, or position information of the movement assistance device.

According to this configuration, it may be possible to appropriately determine the magnitude of the surrounding risk on the movement of the user. Thus, it may be possible to optimize the timing to switch the power mode of the movement assistance apparatus between the normal mode and the power saving mode.

In the movement assistance apparatus according to the first aspect of the present disclosure, the mode switching control unit may be configured to switch the power mode from the power saving mode to the normal mode when the surrounding risk satisfies a predetermined high-risk condition from a state in which the surrounding risk satisfies the predetermined low-risk condition.

In the movement assistance apparatus according to the first aspect of the present disclosure, the mode switching control unit may be configured to switch the power mode from the power saving mode to the normal mode when the risk index acquired by the risk index acquisition unit is larger than the predetermined threshold from a state in which the risk index is equal to or smaller than the predetermined threshold.

By optimizing the timing to switch the power mode from the power saving mode to the normal mode, it may be possible to optimize the start timing of the movement assistance operation, and to enhance the practicality of the movement assistance device including the movement assistance apparatus.

In the movement assistance apparatus according to the first aspect of the present disclosure, the movement assistance apparatus in the power saving mode may be in a sleep state in which power supply to a device built in the movement assistance apparatus is stopped.

According to this configuration, the power consumption of the device may be reduced to zero in the state in which the power mode of the movement assistance apparatus is the power saving mode (sleep state). Thus, great power saving can be realized.

The movement assistance apparatus according to the first aspect of the present disclosure may further include a storage unit configured to store information on a situation in which the movement assistance operation is necessary. The mode switching control unit may be configured to switch the power mode to the normal mode when the user who is moving is in the situation stored in the storage unit in which the movement assistance operation is necessary.

In this configuration, determination may be made about the magnitude of the surrounding risk in the current movement state of the user based on the information stored in the storage unit. It may be possible to make determination about the magnitude of the surrounding risk on the movement of the user without the need for information from means for acquiring the user's periphery information (camera etc.).

In the movement assistance apparatus according to the first aspect of the present disclosure, the mode switching control unit may be configured to switch the power mode by checking information on a current area around the user based on a trained model generated from the information stored in the storage unit on the situation in which the movement assistance operation is necessary.

Thus, it may be possible to optimize the power mode to be switched by the mode switching control unit.

In the movement assistance apparatus according to the first aspect of the present disclosure, the movement assistance device may be gripped or carried by the user.

Examples of an object to be gripped or carried by the user may include a white cane to be gripped by a visually impaired person, and a grip portion of a personal mobility device on which an elderly person or the like rides. By applying the present disclosure to these movement assistance devices, it may be possible to continue, over a long period, a state in which an appropriate movement assistance operation (movement assistance operation at appropriate timings) can be performed by using these movement assistance devices.

A movement assistance system according to a second aspect of the present disclosure includes a movement assistance apparatus provided in a movement assistance device and configured to execute a movement assistance operation for assisting movement of a user, and switch a power mode between a normal mode in which the movement assistance operation is executable and a power saving mode in which a power consumption is smaller than a power consumption in the normal mode, a communication unit provided in a system management server configured to transmit and receive information to and from the movement assistance apparatus, the communication unit being configured to transmit switching command information for the power saving mode to the movement assistance apparatus under satisfaction of a predetermined condition including a condition that a surrounding risk satisfies a predetermined low-risk condition, and a mode switching control unit provided in the movement assistance apparatus and configured to switch the power mode to the power saving mode when the switching command information is received from the communication unit.

When the surrounding risk on the movement of the user is relatively high, the mode switching control unit of the movement assistance apparatus may set the power mode to the normal mode under that condition, thereby enabling the movement assistance operation for assisting the movement of the user. When the surrounding risk on the movement of the user is relatively low and satisfies the predetermined low-risk condition, the switching command information for the power saving mode may be transmitted to the movement assistance apparatus from the communication unit of the system management server under satisfaction of the predetermined condition including the condition that the surrounding risk satisfies the predetermined low-risk condition. In the movement assistance apparatus that has received the switching command information, the mode switching control unit may set the power mode to the power saving mode, and the electric power consumed by the movement assistance apparatus may be reduced to zero. Alternatively, the electric power consumed by the movement assistance apparatus may be reduced. Thus, in the movement assistance system according to the second aspect of the present disclosure, the power mode may be set to the normal mode as necessary so that the movement assistance operation can be executed, and the power mode may be set to the power saving mode when the movement assistance operation is not necessary, thereby reducing the power consumption of the movement assistance apparatus.

In the present disclosure, for the switching of the power mode based on the magnitude of the surrounding risk on the movement of the user, the condition for setting the power mode to the power saving mode may include the condition that the surrounding risk satisfies the predetermined low-risk condition. Thus, the power mode may be set to the normal mode as necessary so that the movement assistance operation can be executed, and the power mode may be set to the power saving mode when the movement assistance operation is not necessary, thereby reducing the power consumption of the movement assistance apparatus. As a result, the function of the movement assistance apparatus (function of performing the movement assistance operation at appropriate timings) can be exerted continuously over a long period without the need to mount a large-size battery, thereby enhancing the practicality in the power saving of the movement assistance apparatus.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

First Embodiment

First, a first embodiment will be described. In the present embodiment, description will be given of a case where a movement assistance apparatus according to the present disclosure is built in a white cane (movement assistance device) used by a visually impaired person. In the following, the visually impaired person may be referred to simply as "user". The user in the present disclosure is not limited to the visually impaired person.

Schematic Configuration of White Cane

Figure 1:
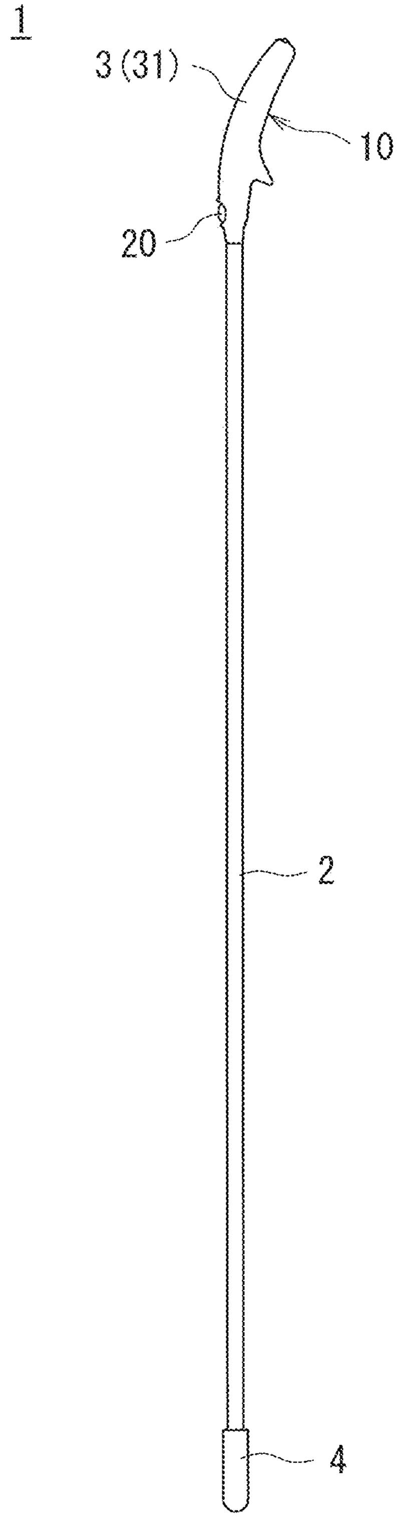
FIG. 1 is a diagram showing a white cane incorporating a movement assistance apparatus according to a first embodiment.

FIG. 1 is a diagram showing a white cane 1 incorporating a movement assistance apparatus 10 according to the present embodiment. As shown in FIG. 1, the white cane 1 includes a shaft portion 2, a grip portion (portion to be gripped) 3, and a tip portion (shoe) 4.

The shaft portion 2 has a hollow rod shape having a substantially circular cross section, and is made of an aluminum alloy, a glass fiber reinforced resin, a carbon fiber reinforced resin, or the like.

The grip portion 3 is provided at the proximal end (upper end) of the shaft portion 2, and is formed by attaching a cover 31 made of an elastic body such as rubber. The grip portion 3 of the white cane 1 in the present embodiment is slightly curved on the tip side (upper side in FIG. 1) in consideration of ease of holding and resistance to slipping when the user grips the grip portion 3. The configuration of the grip portion 3 is not limited to this configuration.

The tip portion 4 is a substantially bottomed tubular member made of a hard synthetic resin or the like, and is externally fitted onto the tip of the shaft portion 2 and fixed by bonding or screwing. The tip portion 4 has a hemispherical end face on the tip side.

The white cane 1 according to the present embodiment is a straight cane that cannot be folded. However, the white cane 1 may be foldable or extensible and contractible at one or more points in the middle of the shaft portion 2.

Configuration of Movement Assistance Apparatus

Hereinafter, the movement assistance apparatus 10 according to the present disclosure will be described.

Figure 2:
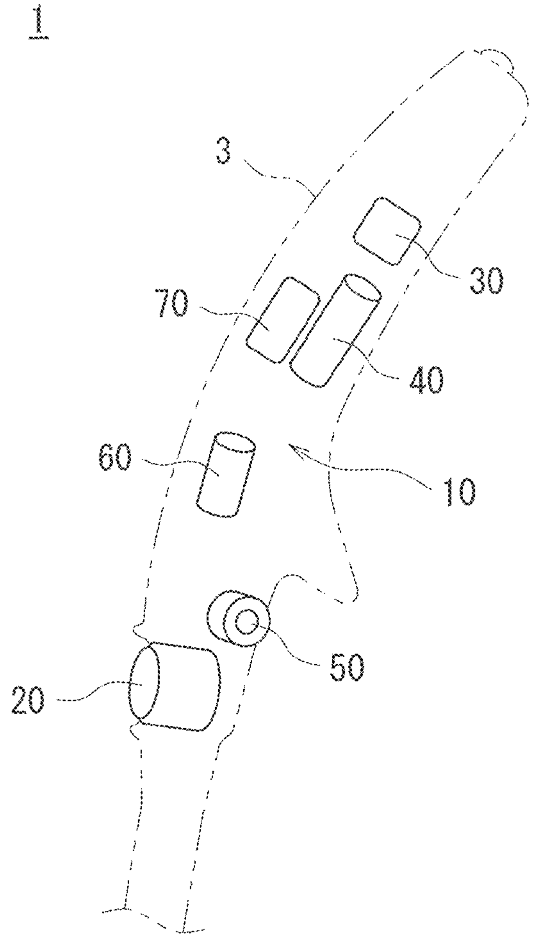
FIG. 2 is a schematic diagram showing the inside of a grip portion of the white cane in the first embodiment.
Figure 3:
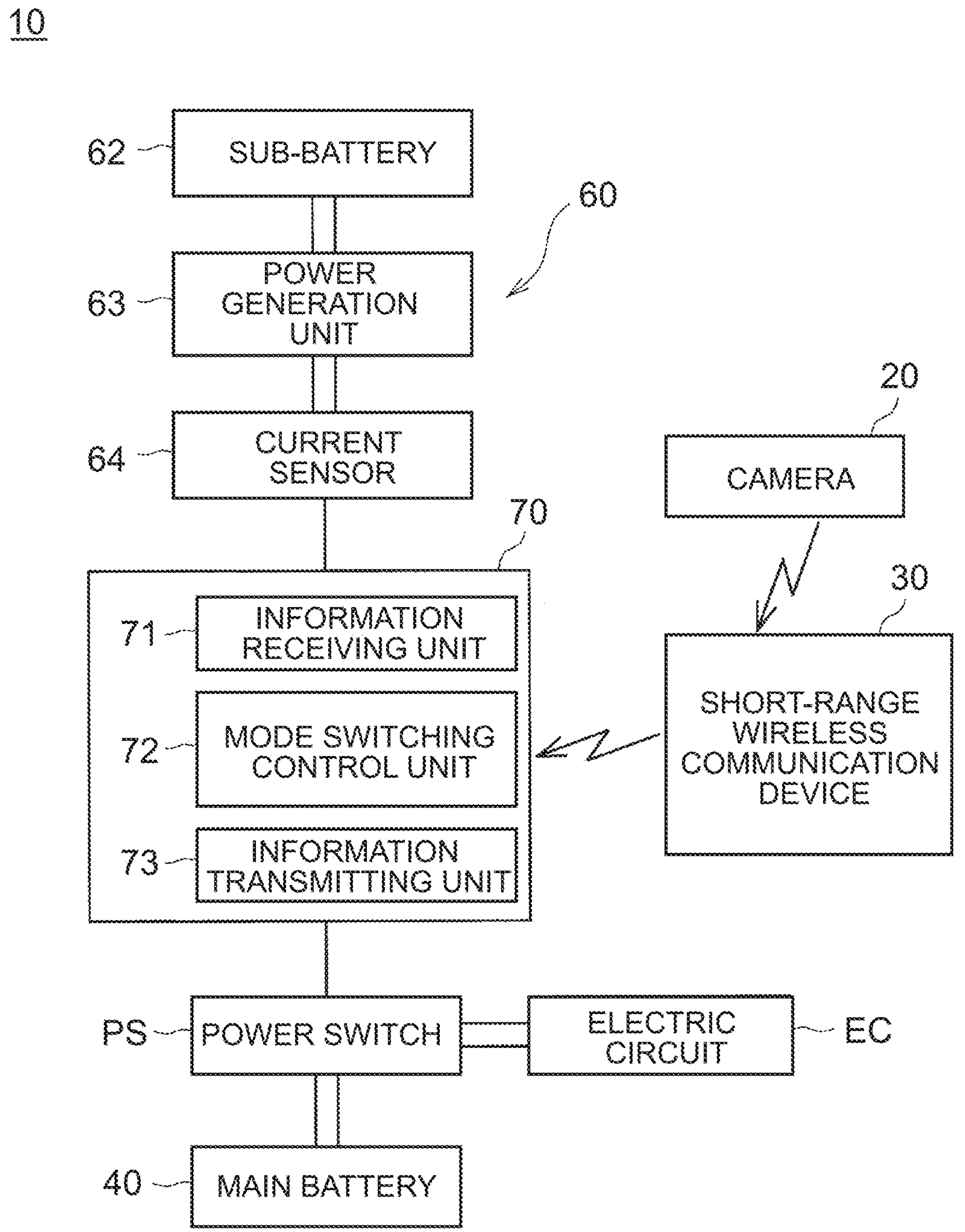
FIG. 3 is a block diagram showing a schematic configuration of a control system of the movement assistance apparatus according to the first embodiment.

FIG. 2 is a schematic diagram showing the inside of the grip portion 3 of the white cane 1. As shown in FIG. 2, the movement assistance apparatus 10 according to the present embodiment is built in the white cane 1. FIG. 3 is a block diagram showing a schematic configuration of a control system of the movement assistance apparatus 10.

As shown in FIG. 2 and FIG. 3, the movement assistance apparatus 10 includes a camera 20, a short-range wireless communication device 30, a main battery 40, a charging socket 50, an activation unit 60, a control device 70, and the like.

The camera 20 is embedded in a front surface of the grip portion 3 (surface oriented in a traveling direction of the user) at the base of the grip portion 3, and captures an image of a forward area in the traveling direction of the user (forward area in a walking direction) at a wide angle. The camera 20 includes, for example, a charge coupled device (CCD) or a complementary metal oxide semiconductor (CMOS). The configuration and the arrangement position of the camera 20 are not limited to those described above, and the camera 20 may be, for example, embedded in a front surface of the shaft portion 2 (surface oriented in the traveling direction of the user).

The short-range wireless communication device 30 is a wireless communication device for performing short-range wireless communication between the camera 20 and the control device 70. For example, short-range wireless communication is performed between the camera 20 and the control device 70 by known communication means such as Bluetooth (registered trademark), and information on an image captured by the camera 20 is wirelessly transmitted to the control device 70.

The main battery 40 is a secondary battery that stores electric power for the camera 20, the short-range wireless communication device 30, and the control device 70.

The charging socket 50 is a portion to which a charging cable is connected when storing electric power in the main battery 40. For example, the charging cable is connected when the user charges the main battery 40 from a household power supply at home.

The activation unit 60 exerts a switching function for activating the movement assistance apparatus 10, and is arranged above the camera 20 at the base of the grip portion 3.

Figure 4:
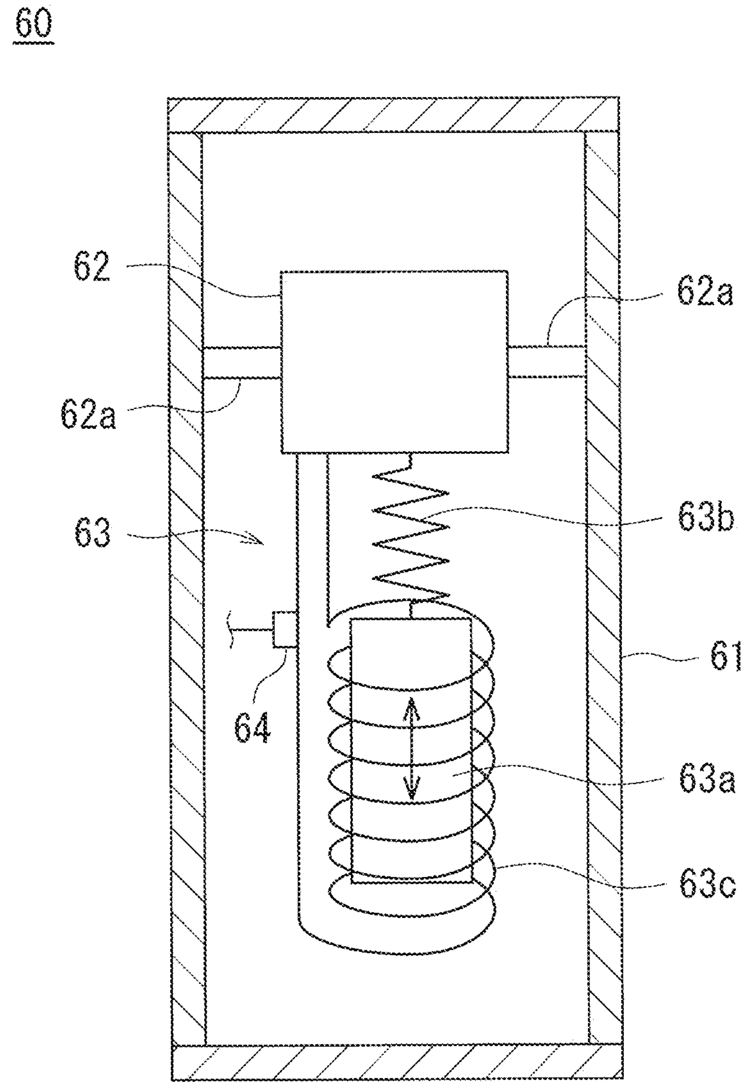
FIG. 4 is a schematic diagram showing a schematic configuration of an activation unit provided in the movement assistance apparatus according to the first embodiment.

FIG. 4 is a schematic diagram showing a schematic configuration of the activation unit 60. As shown in FIG. 4, the activation unit 60 generates electric power by electromagnetic induction, and includes a sub-battery 62, a power generation unit 63, and a current sensor 64 in a casing 61. The power generation unit 63 includes a magnet 63*a*, a coil spring 63*b*, and an electromagnetic coil 63*c*.

Specifically, the sub-battery 62 is a secondary battery that stores electric power generated by the power generation unit 63. The sub-battery 62 is supported on the casing 61 by coupling shafts 62*a* and 62*a*.

As a configuration of the power generation unit 63, the magnet 63*a* is attached to the lower end of the coil spring 63*b* attached to the lower surface of the sub-battery 62. The electromagnetic coil 63*c* is arranged on the outer periphery of the magnet 63*a*. The electromagnetic coil 63*c* is connected to positive and negative terminals (not shown) of the sub-battery 62. Therefore, when the magnet 63*a* reciprocates along a vertical direction (extending direction of the grip portion 3) along with the extension and contraction of the coil spring 63*b*, an induced current is generated by electromagnetic induction along with a change in a magnetic field in the electromagnetic coil 63*c*, and the sub-battery 62 is charged with this induced current. In the present embodiment, the sub-battery 62 is charged with the electric power generated by the electromagnetic induction, but the electromagnetic coil 63*c* may be connected to positive and negative terminals of the main battery 40 without providing the sub-battery 62, and the main battery 40 may be charged with the electric power generated by the electromagnetic induction.

In the present embodiment, the resonance frequency (natural frequency) of the spring mass system constituted by the magnet 63*a* and the coil spring 63*b* is substantially equal to the frequency of an approach notification sound of a vehicle. The approach notification sound is emitted toward an area ahead of a vehicle (for example, an electrified vehicle or a fuel cell electric vehicle) from a speaker mounted on the vehicle to notify a pedestrian or the like about approach of the vehicle. The approach notification sound is a sound in a predetermined frequency band. Therefore, when the vehicle emitting the approach notification sound is present near the user gripping the white cane 1 (for example, the vehicle emitting the approach notification sound is approaching the user gripping the white cane 1), the spring mass system resonates with the approach notification sound and the magnet 63*a* reciprocates along the vertical direction along with the extension and contraction of the coil spring 63*b* to generate electric power by the electromagnetic induction.

More specifically, when the vehicle emitting the approach notification sound is approaching the user gripping the white cane 1, an approach notification sound having a frequency slightly higher than that of an actual approach notification sound reaches the white cane 1 due to the Doppler effect. Therefore, the resonance frequency of the spring mass system constituted by the magnet 63*a* and the coil spring 63*b* is set as the frequency slightly higher than that of the actual approach notification sound (sound emitted from the speaker) in consideration of the Doppler effect (frequency higher by an amount corresponding to frequency shift due to the Doppler effect). Therefore, when the vehicle emitting the approach notification sound is approaching the user gripping the white cane 1, the spring mass system resonates with the approach notification sound to generate electric power by the electromagnetic induction. When the vehicle emitting the approach notification sound is present near the user but is moving away from the user, the spring mass system does not resonate with the approach notification sound and no electric power is generated by the electromagnetic induction. The value of the resonance frequency of the spring mass system to be set as the frequency slightly higher than that of the actual approach notification sound is set as appropriate by experiment or simulation (in consideration of an average vehicle speed of the vehicle and the frequency shift due to the Doppler effect associated with the average vehicle speed).

When the spring mass system is resonant with the approach notification sound, vibration is generated along with the reciprocation of the magnet 63*a* along the vertical direction. This vibration is transmitted to the grip portion 3 via the casing 61. Therefore, the vibration is transmitted to the hand of the user gripping the grip portion 3 of the white cane 1. The user can be notified about the approach of the vehicle (vehicle emitting the approach notification sound). That is, caution can be given to the user.

With such a configuration, a resonance device according to the present disclosure (resonance device configured to resonate with a sound emitted by a vehicle approaching the user) is constituted by the magnet 63*a* and the coil spring 63*b*, and a power generation device according to the present disclosure (power generation device configured to generate electric power along with the resonance of the resonance device) is constituted by the magnet 63*a* and the electromagnetic coil 63*c* (the magnet 63*a* is a component of the resonance device and also a component of the power generation device).

The current sensor (detection device according to the present disclosure) 64 is arranged on a conductor wire connected to the electromagnetic coil 63*c*. When electric power is generated by the electromagnetic induction, the current sensor 64 detects a current value (physical quantity related to the power generation) of the electric power. Information on the detected current value is transmitted from the current sensor 64 to the control device 70. The current sensor 64 may be any of a known resistance detection sensor and a magnetic field detection sensor. The information on the current value may be transmitted from the current sensor 64 to the control device 70 by wire or by wireless (for example, using the short-range wireless communication device 30). When transmitting the current value information by wireless, for example, electric power generated by the electromagnetic induction or electric power stored in the sub-battery 62 may be used.

The control device 70 includes, for example, a processor such as a central processing unit (CPU), a read-only memory (ROM) for storing a control program, a random-access memory (RAM) for temporarily storing data, and an input/output port.

The control device 70 includes an information receiving unit 71, a mode switching control unit 72, and an information transmitting unit 73 as functional units implemented by the control program. The outline of the functions of these units will be described below.

The information receiving unit 71 receives information on an image captured by the camera 20 from the camera 20 via the short-range wireless communication device 30 at predetermined time intervals in a state in which a power mode described later is a normal mode. The information receiving unit 71 receives information on a current value from the current sensor 64 (information on a current value detected by the current sensor 64) when electric power is generated by the electromagnetic induction.

The mode switching control unit 72 generates switching command information for switching the power mode of the movement assistance apparatus 10 based on the information on the current value received by the information receiving unit 71. Specifically, a power switch PS is interposed between the main battery 40 and an electric circuit EC for executing a movement assistance operation by the movement assistance apparatus 10, and the mode switching control unit 72 generates switching command information for switching ON and OFF of the power switch PS.

Specifically, when the current value included in the information from the current sensor 64 is larger than a predetermined threshold (this case can be regarded as an example of a state in which a surrounding risk satisfies a predetermined high-risk condition according to the present disclosure), the mode switching control unit 72 generates switching command information for turning ON the power switch PS (switch-ON command information). When the current value included in the information from the current sensor 64 is equal to or smaller than the predetermined threshold (this case can be regarded as an example of a state in which the surrounding risk satisfies a predetermined low-risk condition according to the present disclosure), the mode switching control unit 72 generates switching command information for turning OFF the power switch PS (switch-OFF command information). The switching command information generated by the mode switching control unit 72 is transmitted from the information transmitting unit 73 to the power switch PS. That is, in the present disclosure, for example, the mode switching control unit determines whether the surrounding risk satisfies the predetermined low-risk condition. The component for determining whether the surrounding risk satisfies the predetermined low-risk condition is not limited to the mode switching control unit. The predetermined threshold is determined by experiment or simulation in advance.

When the switch-ON command information is transmitted to the power switch PS, the power switch PS is turned ON and the power mode of the movement assistance apparatus 10 is set to the normal mode in which electric power is supplied from the main battery 40 to the electric circuit EC. In the normal mode, activation of the camera 20 (start of image capturing) and activation of the short-range wireless communication device 30 (transmission of information on an image captured by the camera 20 to the control device 70) are performed and the movement assistance operation can be performed by the operation of the movement assistance apparatus 10.

When the switch-OFF command information is transmitted to the power switch PS in a state in which the power switch PS is ON, the power switch PS is turned OFF and the power mode of the movement assistance apparatus 10 is set to a power saving mode in which electric power is not supplied from the main battery 40 to the electric circuit EC (power saving mode in which the power consumption is smaller than that in the normal mode), thereby stopping the operation of the movement assistance apparatus 10. That is, the movement assistance operation cannot be performed by the operation of the movement assistance apparatus 10.

Since such a switching operation of the power mode is performed, the current value detected by the current sensor 64 corresponds to an example of a risk index according to the present disclosure (risk index correlated to the surrounding risk on the movement of the user; the physical quantity detected by the detection device), and the activation unit 60 corresponds to an example of a risk index acquisition unit according to the present disclosure (risk index acquisition unit configured to acquire the risk index correlated to the surrounding risk on the movement of the user). The state in which the current value included in the information from the current sensor 64 is equal to or smaller than the predetermined threshold corresponds to an example of a state in which "the surrounding risk satisfies the predetermined low-risk condition" and a state in which "the risk index acquired by the risk index acquisition unit is equal to or smaller than the predetermined threshold" according to the present disclosure.

Operation of Movement Assistance Apparatus

Figure 5:
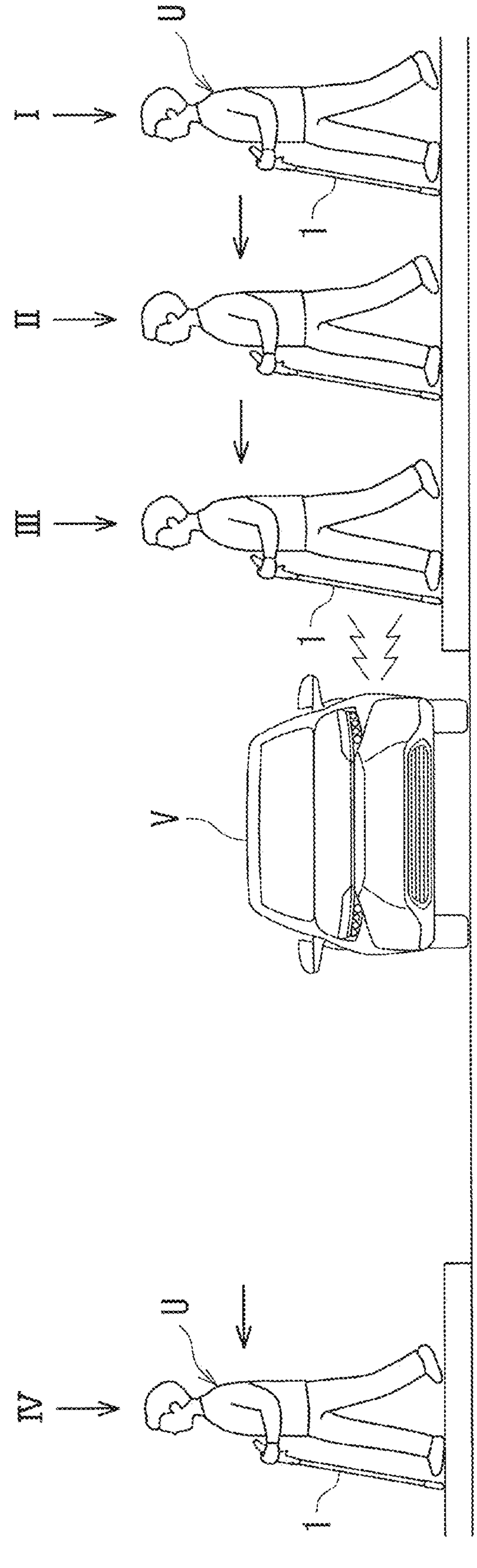
FIG. 5 is a diagram illustrating an operation of the movement assistance apparatus during movement of a user in the first embodiment.

Next, an operation of the movement assistance apparatus 10 configured as described above will be described. FIG. 5 is a diagram illustrating an operation of the movement assistance apparatus 10 during movement of a user U. FIG. 5 shows a case where, when the user U moving on a sidewalk (visually impaired person gripping the white cane 1) crosses a roadway, a vehicle V traveling on the roadway is approaching the user U while emitting the approach notification sound. The user U approaches the roadway in the order of a position I, a position II, and a position III while moving.

In a state in which the user U is moving at the position I, the approach notification sound of the vehicle V has not reached the white cane 1. Therefore, the spring mass system (spring mass system constituted by the magnet 63*a* and the coil spring 63*b*) has not resonated with the approach notification sound and the power generation unit 63 has not generated electric power.

When the user U reaches the position II, the approach notification sound of the vehicle V reaches the white cane 1. The spring mass system resonates with the approach notification sound and the power generation unit 63 starts to generate electric power. When the current value detected by the current sensor 64 is larger than the predetermined threshold along with the power generation, the mode switching control unit 72 generates the switch-ON command information based on information on the current value received from the current sensor 64. The switch-ON command information is transmitted from the information transmitting unit 73 to the power switch PS, the power switch PS is turned ON, and the power mode of the movement assistance apparatus 10 is set to the normal mode in which electric power is supplied from the main battery 40 to the electric circuit EC. That is, the camera 20 and the short-range wireless communication device 30 are activated by the power supply from the main battery 40. Therefore, determination can be made as to whether the movement assistance operation is necessary based on information on the surrounding image captured by the camera 20, and the movement assistance operation can be performed as necessary. That is, the system enters a standby state in a stage preceding the execution of the movement assistance operation. As described above, vibration generated along with the resonance of the spring mass system with the approach notification sound is transmitted to the grip portion 3 and also to the hand of the user U gripping the grip portion 3 of the white cane 1. Thus, the user U is notified about the approach of the vehicle V (vehicle emitting the approach notification sound), thereby giving caution to the user U. At the position II, the vehicle V is not present in the image captured by the camera 20. Determination is made that the movement assistance operation is not necessary, and the movement assistance operation (for example, alert for the user U by voice or sound) has not been started.

When the user U reaches the position III, the vehicle V is present in the image captured by the camera 20. Determination is made that the movement assistance operation for the user U is necessary, and the user U is notified for caution (alert against the approach of the vehicle). For example, a voice or sound notification is given from a speaker (not shown) mounted on the white cane 1 (for example, a notification of the approach of the vehicle or a direction in which the vehicle is approaching). The white cane 1 may include an individual vibration generator (vibration generator configured to vibrate in a pattern different from that of the vibration generated by the resonance of the spring mass system), and the user U may be notified for caution by the vibration of the vibration generator. The user U who recognizes the caution given by the movement assistance operation stops the movement (walking) and waits for the vehicle V to pass.

When the vehicle V has passed in front of the user U, the approach notification sound reaching the white cane 1 turns into a sound that does not resonate with the spring mass system (sound having a frequency lower by an amount corresponding to the frequency shift due to the Doppler effect) or the approach notification sound of the vehicle V no longer reaches the white cane 1. Therefore, the spring mass system does not resonate and the power generation unit 63 stops the power generation. Thus, the current value detected by the current sensor 64 is equal to or smaller than the predetermined threshold, and the mode switching control unit 72 generates the switch-OFF command information based on information on the current value received from the current sensor 64. The switch-OFF command information is transmitted from the information transmitting unit 73 to the power switch PS, the power switch PS is turned OFF, and the power mode of the movement assistance apparatus 10 is switched from the normal mode to the power saving mode to stop the power supply from the main battery 40 to the electric circuit EC.

A position IV in FIG. 5 is a position of the user U having crossed a crosswalk after the vehicle V has passed, and the power saving mode is maintained unless the vehicle V emitting the approach notification sound approaches the user U.

Such an operation is repeated during the movement of the user U every time the vehicle V emitting the approach notification sound approaches the user U.

Effects of Embodiment

In the present embodiment described above, when the vehicle V is approaching the user U (the surrounding risk is relatively high), the mode switching control unit 72 sets the power mode of the movement assistance apparatus 10 to the normal mode under that condition, thereby enabling the movement assistance operation for assisting the movement (walking) of the user U. When the vehicle V is not approaching the user U (the surrounding risk is relatively low), the mode switching control unit 72 sets the power mode of the movement assistance apparatus 10 to the power saving mode under that condition. Thus, the electric power consumed by the movement assistance apparatus 10 is zero. Alternatively, the electric power consumed by the movement assistance apparatus 10 is reduced. That is, the mode switching control unit switches, based on the magnitude of the surrounding risk on the movement of the user, the power mode between the normal mode in which the movement assistance operation can be executed and the power saving mode in which the power consumption is smaller than that in the normal mode. Thus, the power mode is set to the normal mode as necessary so that the movement assistance operation can be executed, and the power mode is set to the power saving mode when the movement assistance operation is not necessary, thereby reducing the power consumption of the movement assistance apparatus 10. As a result, the function of the movement assistance apparatus 10 (function of performing the movement assistance operation at appropriate timings) can be exerted continuously over a long period without the need to mount a large-size main battery, thereby enhancing the practicality in the power saving of the movement assistance apparatus 10.

In the present embodiment, the surrounding risk on the movement of the user U can be recognized by using the approach notification sound emitted by the vehicle V. Therefore, the surrounding risk can be recognized without using electric power, thereby contributing to the power saving of the movement assistance apparatus 10.

The approach notification sound is the sound in the predetermined frequency band, and the spring mass system (resonance device) resonates with this approach notification sound. Therefore, it is possible to suppress resonance of the spring mass system with a sound other than the sound emitted by the vehicle V (surrounding noise or the like) and accurately recognize the surrounding risk such as the approach of the vehicle V to the user U. As a result, it is possible to reduce the occurrence of a situation in which the power saving mode is terminated unnecessarily (the power saving mode is terminated because the spring mass system resonates with surrounding noise or the like even though the vehicle V is not approaching the user U).

In particular, in the present embodiment, the resonance frequency of the spring mass system is set higher than the frequency of the approach notification sound emitted by the vehicle V by the amount corresponding to the frequency shift due to the Doppler effect when the vehicle V approaches the user U. Therefore, only when the vehicle V is approaching the user U, the spring mass system resonates with the approach notification sound and the power generation unit 63 generates electric power. That is, in a situation in which the vehicle V is moving away from the user U, the spring mass system does not resonate with the approach notification sound emitted by the vehicle V and the power generation unit 63 does not generate electric power. Therefore, it is possible to increase the accuracy of recognition of the surrounding risk on the movement of the user U, and reduce the occurrence of a situation in which the power saving mode is terminated even though the vehicle V is moving away from the user U, thereby contributing further to the power saving of the movement assistance apparatus 10.

In the present embodiment, the spring mass system resonates with the approach notification sound emitted by the vehicle V and the vibration is transmitted to the hand of the user U, thereby giving caution to the user U. Even if the user (visually impaired person) U cannot hear the approach notification sound emitted by the vehicle V (the approach notification sound is lost in the surrounding noise), the user U can recognize the approach of the vehicle V.

Second Embodiment

Next, a second embodiment will be described. The present embodiment is different from the embodiment described above in terms of the configuration of the activation unit 60. The other configuration and operation are the same as those in the embodiment described above, and therefore only the configuration of the activation unit 60 will be described.

Figure 6:
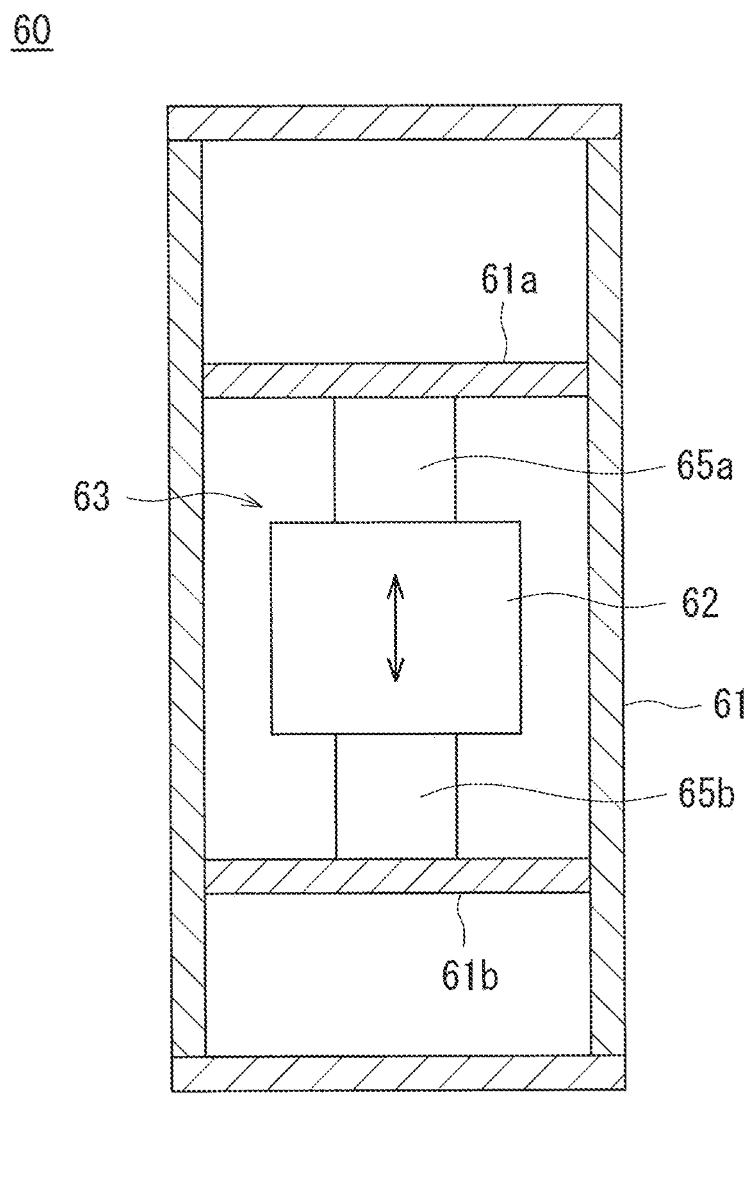
FIG. 6 is a schematic diagram showing a schematic configuration of an activation unit provided in a movement assistance apparatus according to a second embodiment.

FIG. 6 is a schematic diagram showing a schematic configuration of the activation unit 60 provided in the movement assistance apparatus 10 according to the present embodiment. As shown in FIG. 6, the activation unit 60 according to the present embodiment includes support plates 61*a* and 61*b* positioned with a predetermined distance therebetween in the casing 61. The support plates 61*a* and 61*b* are fixed to the inner wall of the casing 61.

The sub-battery 62 is arranged between the support plates 61*a* and 61*b*, and piezoelectric elements 65*a* and 65*b* are arranged between the upper surface of the sub-battery 62 and the upper support plate 61*a* and between the lower surface of the sub-battery 62 and the lower support plate 61*b*, respectively. That is, the upper surface of the upper piezoelectric element 65*a* is joined to the upper support plate 61*a*, and the lower surface of the upper piezoelectric element 65*a* is joined to the upper surface of the sub-battery 62. Similarly, the upper surface of the lower piezoelectric element 65*b* is joined to the lower surface of the sub-battery 62, and the lower surface of the lower piezoelectric element 65*b* is joined to the lower support plate 61*b*. Power lines (not shown) of the piezoelectric elements 65*a* and 65*b* are connected to the positive and negative terminals (not shown) of the sub-battery 62. A current sensor (not shown) is provided on the power lines, and information on a detected current value is transmitted from the current sensor to the control device 70 (see FIG. 3).

In the present embodiment, the resonance frequency (natural frequency) of the spring mass system constituted by the sub-battery 62 and the piezoelectric elements 65*a* and 65*b* is substantially equal to the frequency of the approach notification sound of the vehicle. More specifically, the resonance frequency is set as the frequency slightly higher than that of the actual approach notification sound (sound emitted from the speaker) in consideration of the Doppler effect (frequency higher by the amount corresponding to the frequency shift due to the Doppler effect).

Therefore, when the vehicle emitting the approach notification sound is present near the user gripping the white cane 1 (for example, the vehicle emitting the approach notification sound is approaching the user gripping the white cane 1), the spring mass system resonates with the approach notification sound and a pressure is periodically applied from the sub-battery 62 to the piezoelectric elements 65*a* and 65*b* to generate electric power by a piezoelectric effect. The sub-battery 62 is charged with the generated electric power.

With such a configuration, the resonance device according to the present disclosure is constituted by the sub-battery 62 and the piezoelectric elements 65*a* and 65*b*, and the power generation device according to the present disclosure is constituted by the piezoelectric elements 65*a* and 65*b*.

As in the case of the embodiment described above, when electric power is generated by the resonance of the spring mass system with the approach notification sound of the vehicle, a current flows through the power lines of the piezoelectric elements 65*a* and 65*b* connected to the positive and negative terminals (not shown) of the sub-battery 62, the current sensor provided on the power lines detects a current value, and information on the detected current value is transmitted from the current sensor to the control device 70 (see FIG. 3). When the current value is larger than the predetermined threshold, the mode switching control unit 72 generates the switch-ON command information based on the information on the current value received from the current sensor. The switch-ON command information is transmitted from the information transmitting unit 73 to the power switch PS, the power switch PS is turned ON, and the power mode of the movement assistance apparatus 10 is set to the normal mode. When the spring mass system does not resonate with the approach notification sound of the vehicle and no electric power is generated, the power switch PS is turned OFF and the power mode of the movement assistance apparatus 10 is set to the power saving mode.

Also in the present embodiment, it is possible to attain the same effects as those in the embodiment described above. That is, the power mode is set to the normal mode as necessary so that the movement assistance operation can be executed, and the power mode is set to the power saving mode when the movement assistance operation is not necessary, thereby reducing the power consumption of the movement assistance apparatus 10. As a result, the function of the movement assistance apparatus 10 (function of performing the movement assistance operation at appropriate timings) can be exerted continuously over a long period without the need to mount a large-size main battery, thereby enhancing the practicality in the power saving of the movement assistance apparatus 10.

In the present embodiment, the spring mass system is constituted by using the sub-battery 62. Therefore, it is possible to reduce the number of components of the activation unit 60.

Third Embodiment

Next, a third embodiment will be described. In the present embodiment, a plurality of activation units 60 is arranged inside the grip portion 3 of the white cane 1. In the present embodiment, description will be given of a case where the activation unit 60 described in the first embodiment (see FIG. 4) is applied as each of the activation units 60.

Figure 7:
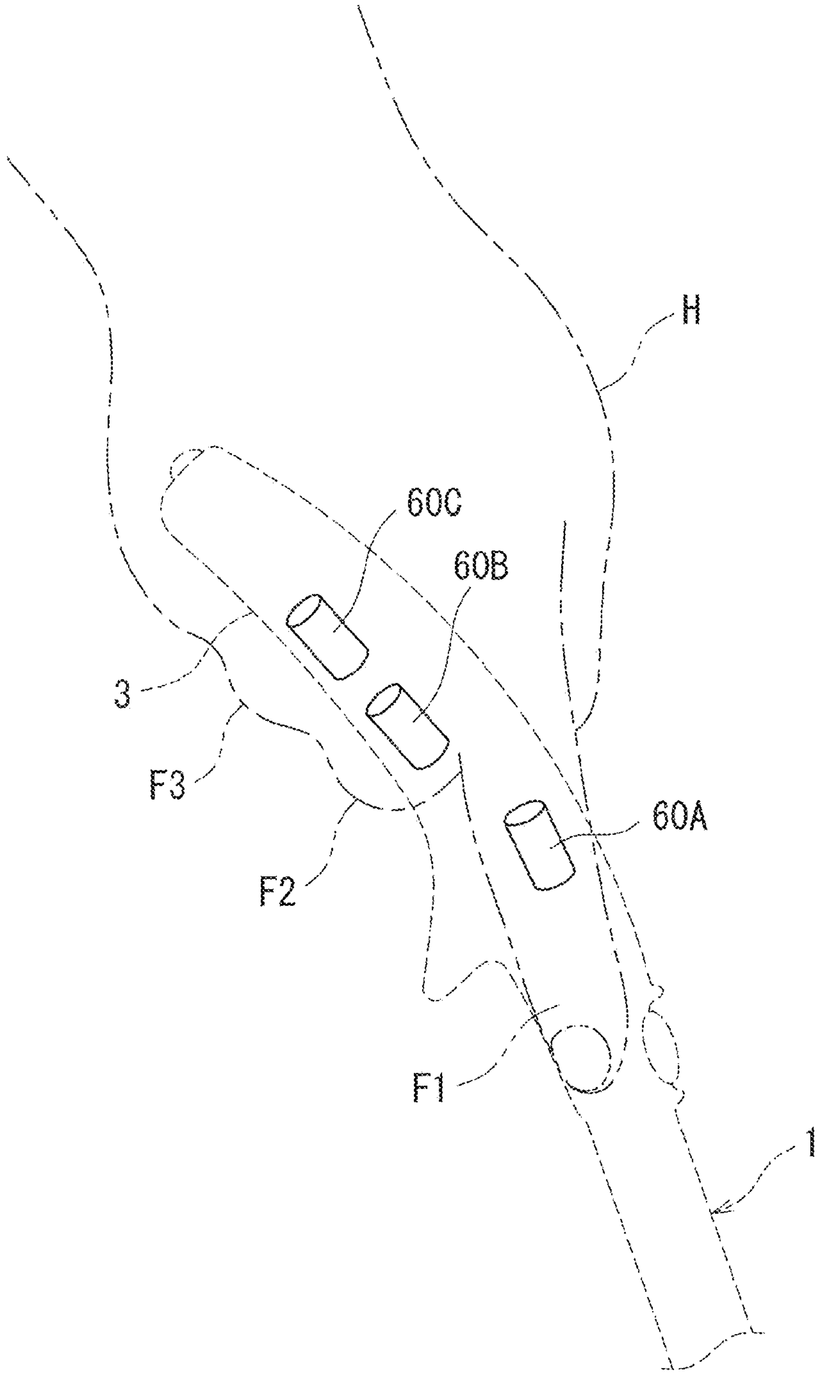
FIG. 7 is a diagram showing a state in which the user grips a white cane according to a third embodiment.

FIG. 7 is a diagram showing a state in which the user grips the white cane 1 according to the present embodiment. In FIG. 7, the white cane 1 is represented by dashed lines, and a user's hand H (hand gripping the grip portion 3) is represented by long dashed double-short dashed lines.

Activation units 60A, 60B, and 60C are a first activation unit 60A arranged at a position corresponding to an index finger F1 of the hand H of the user gripping the grip portion 3 (position corresponding to a contact area where the index finger F1 is in contact with the surface of the grip portion 3), a second activation unit 60B arranged at a position corresponding to a middle finger F2 of the user's hand (position corresponding to a contact area where the middle finger F2 is in contact with the surface of the grip portion 3), and a third activation unit 60C arranged at a position corresponding to a ring finger F3 of the user's hand (position corresponding to a contact area where the ring finger F3 is in contact with the surface of the grip portion 3). The activation units 60A, 60B, and 60C include the current sensors 64 (see FIG. 4), and pieces of information on current values are transmitted to the control device 70 from the current sensors 64 of the activation units 60A, 60B, and 60C that have generated electric power along with resonance. In a case where the plurality of current sensors 64 is provided, the state in which the current value included in the information from each of the current sensors 64 is equal to or smaller than the predetermined threshold corresponds to an example of a state in which "the surrounding risk satisfies the predetermined low-risk condition" and a state in which "the risk index acquired by the risk index acquisition unit is equal to or smaller than the predetermined threshold" according to the present disclosure.

The resonance frequencies (natural frequencies) of the spring mass systems (see FIG. 4) constituted by the magnets 63*a* and the coil springs 63*b* of the activation units 60A, 60B, and 60C are different from each other. For example, the resonance frequency of the spring mass system of the first activation unit 60A is substantially equal to the frequency of the approach notification sound of the vehicle (more specifically, the frequency slightly higher than that of the actual approach notification sound in consideration of the Doppler effect). The resonance frequency of the spring mass system of the second activation unit 60B is substantially equal to the frequency of a siren sound of an emergency vehicle (for example, an ambulance) (for example, 960 Hz or 770 Hz; more specifically, a frequency slightly higher than that of an actual siren sound in consideration of the Doppler effect). The resonance frequency of the spring mass system of the third activation unit 60C is substantially equal to the frequency of a traveling sound of a train. That is, the resonance frequencies of the spring mass systems of the activation units 60A, 60B, and 60C are individually set based on the frequencies of the sounds of the vehicles that emit the sounds at the different frequencies.

Therefore, when the vehicle emitting the approach notification sound is present near the user gripping the white cane 1 (for example, the vehicle emitting the approach notification sound is approaching the user gripping the white cane 1), only the spring mass system of the first activation unit 60A resonates with the approach notification sound and the magnet 63*a* of the first activation unit 60A reciprocates along the vertical direction along with the extension and contraction of the coil spring 63*b* to generate electric power by the electromagnetic induction. Further, vibration generated along with the reciprocation is transmitted to the grip portion 3 via the casing 61. Since the first activation unit 60A is arranged at the position corresponding to the index finger F1 of the user's hand H gripping the grip portion 3 of the white cane 1, the vibration is mainly transmitted to the index finger F1. When the emergency vehicle emitting the siren sound is present near the user gripping the white cane 1 (for example, the emergency vehicle emitting the siren sound is approaching the user gripping the white cane 1), only the spring mass system of the second activation unit 60B resonates with the siren sound and the second activation unit 60B generates electric power. Further, vibration generated along with the resonance is transmitted to the grip portion 3 via the casing 61. Since the second activation unit 60B is arranged at the position corresponding to the middle finger F2 of the user's hand H gripping the grip portion 3 of the white cane 1, the vibration is mainly transmitted to the middle finger F2. When the train is approaching the user gripping the white cane 1, only the spring mass system of the third activation unit 60C resonates with the traveling sound of the train and the third activation unit 60C generates electric power. Further, vibration generated along with the resonance is transmitted to the grip portion 3 via the casing 61. Since the third activation unit 60C is arranged at the position corresponding to the ring finger F3 of the user's hand H gripping the grip portion 3 of the white cane 1, the vibration is mainly transmitted to the ring finger F3.

The operation of activating the movement assistance apparatus 10 by the power generation along with the resonance and the movement assistance operation through the activation are the same as those in the embodiments described above. Therefore, description thereof will be omitted.

In the present embodiment, the user recognizes in advance the relationships among the arrangement positions of the activation units 60A, 60B, and 60C, the sounds that resonate with the activation units 60A, 60B, and 60C (approach notification sound, siren sound, and traveling sound), and the types of the vehicles that emit the sounds (recognizes in advance the arrangement position of the first activation unit 60A that resonates with the approach notification sound emitted by the vehicle such as an electrified vehicle, the arrangement position of the second activation unit 60B that resonates with the siren sound emitted by the emergency vehicle, and the arrangement position of the third activation unit 60C that resonates with the traveling sound of the train), thereby grasping the resonating spring mass system of any one of the activation units 60A, 60B, and 60C while gripping the grip portion 3 of the white cane 1. Thus, the user can know the type of the approaching vehicle (type of vehicle associated with the resonating sound). That is, the user can know the approach of the vehicle and the type of the vehicle even in a situation in which the user cannot see the vehicle or cannot hear the sound emitted by the vehicle.

Fourth Embodiment

Next, a fourth embodiment will be described. In the present embodiment, the activation units 60A, 60B, and 60C are arranged inside the grip portion 3 of the white cane 1 as in the third embodiment described above. In addition, switches to be operated by the user and a function of notifying a vehicle about the presence of the user are provided.

Figure 8:
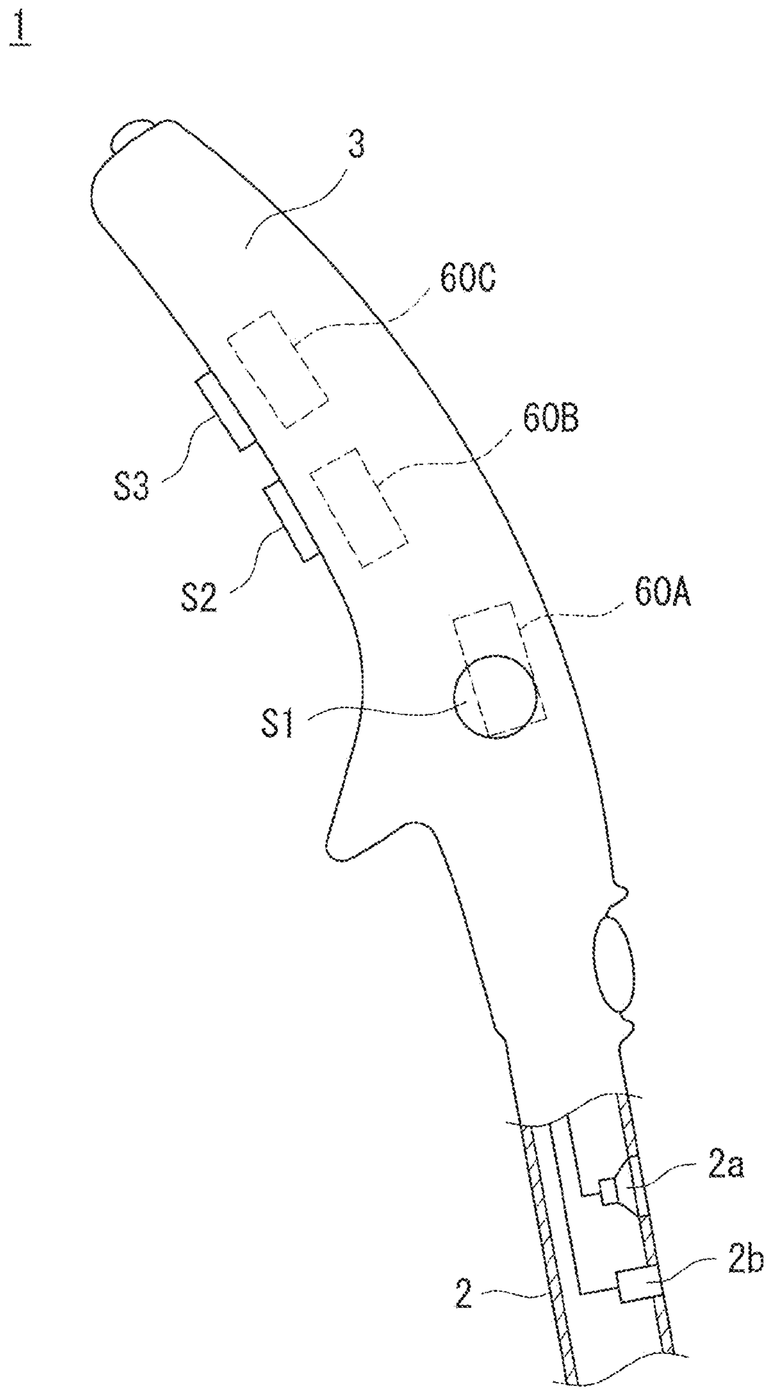
FIG. 8 is a cutaway view showing a part of the periphery of a grip portion of a white cane according to a fourth embodiment.
Figure 9:
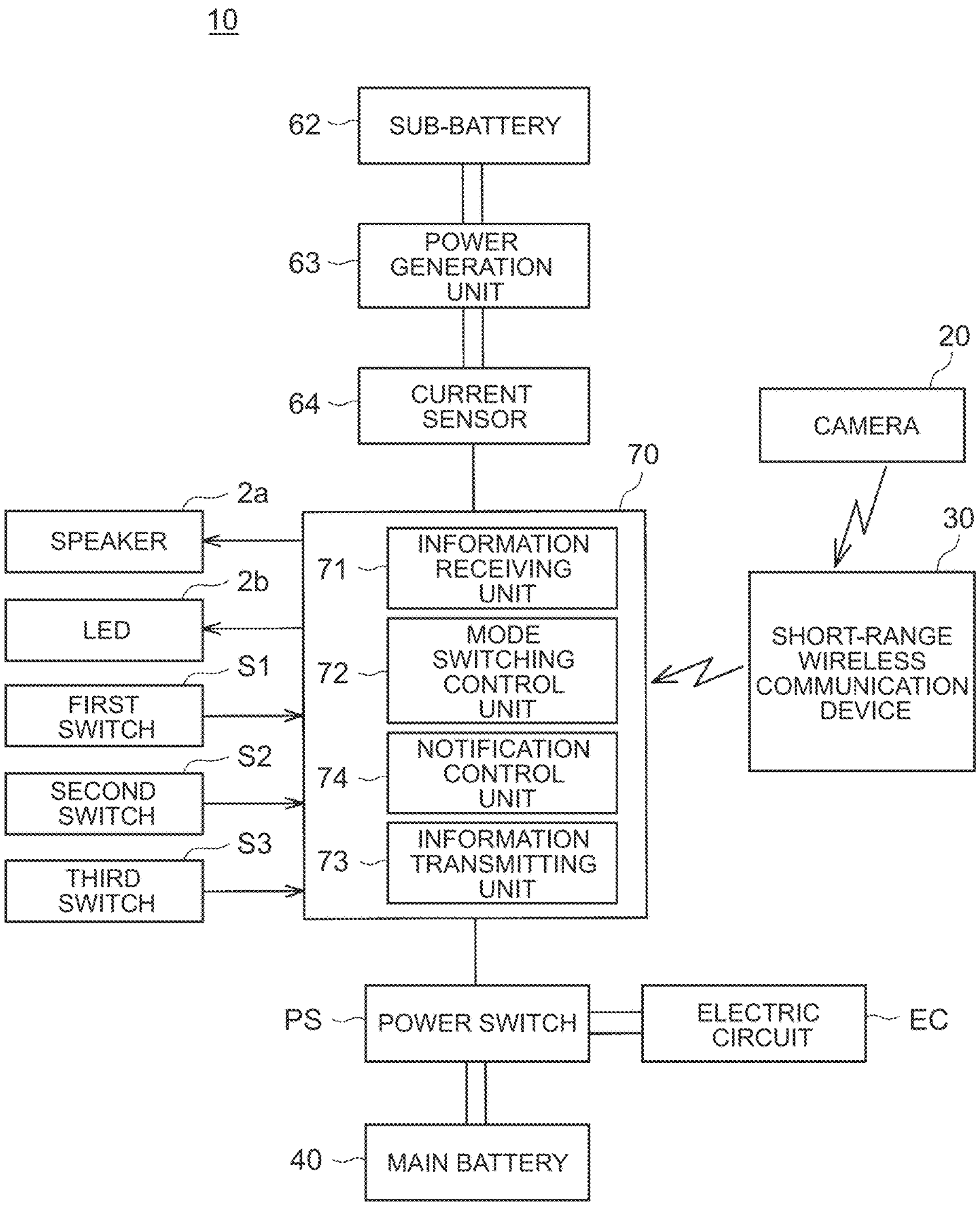
FIG. 9 is a block diagram showing a schematic configuration of a control system of a movement assistance apparatus according to the fourth embodiment.

FIG. 8 is a cutaway view showing a part of the periphery of the grip portion 3 of the white cane 1 according to the present embodiment. FIG. 9 is a block diagram showing a schematic configuration of a control system of the movement assistance apparatus 10 according to the present embodiment.

As shown in FIG. 8 and FIG. 9, switches S1, S2, and S3 are provided at three positions on the grip portion 3 of the white cane 1 in the present embodiment. The switches S1, S2, and S3 are push switches. Specifically, the grip portion 3 includes a first switch S1 arranged at a position corresponding to the arrangement position of the first activation unit 60A and to be pressed (pushed) by the user with the index finger, a second switch S2 arranged at a position corresponding to the arrangement position of the second activation unit 60B and to be pressed by the user with the middle finger, and a third switch S3 arranged at a position corresponding to the arrangement position of the third activation unit 60C and to be pressed by the user with the ring finger.

The switches S1, S2, and S3 are pressed when the user who recognized the presence of the vehicle by the vibration becomes unable to recognize the vehicle. For example, when the user who recognized that the vehicle emitting the approach notification sound was approaching the user by the transmission of the vibration from the first activation unit 60A to the index finger F1 (see FIG. 7) then becomes unable to recognize whether the vehicle is still approaching, the user presses the first switch S1 to provide the control device 70 with information indicating that the user is unable to recognize whether the vehicle is approaching. Similarly, when the user who recognized that the emergency vehicle emitting the siren sound was approaching the user by the transmission of the vibration from the second activation unit 60B to the middle finger F2 then becomes unable to recognize whether the emergency vehicle is still approaching, the user presses the second switch S2. When the user who recognized that the train was approaching the user by the transmission of the vibration from the third activation unit 60C to the ring finger F3 then becomes unable to recognize whether the train is still approaching, the user presses the third switch S3.

As shown in FIG. 9, the switches S1, S2, and S3 are connected to the control device 70. Press signals are transmitted from the pressed switches S1, S2, and S3 to the control device 70. The press signal may be transmitted to the control device 70 by wire or by wireless (for example, using the short-range wireless communication device 30). When transmitting the press signal by wireless, for example, electric power generated by the electromagnetic induction or electric power stored in the sub-battery 62 is used preferably.

As shown in FIG. 8, a speaker 2*a* and a light emitting diode (LED) light 2*b* are provided on the shaft portion 2 of the white cane 1 in the present embodiment. The speaker 2*a* emits an alert sound toward the outside. The speaker 2*a* emits the alert sound to the vehicle approaching the user as necessary. For example, the speaker 2*a* is a directional speaker having directivity in an emitting direction of the alert sound, and emits the alert sound in a specific direction (direction toward the vehicle approaching the user). That is, the position of the vehicle is recognized based on an image from the camera 20, and the alert sound is emitted toward the vehicle. There may be employed such a configuration that a rotary mechanism capable of changing the direction of the speaker 2*a* is provided and the direction of the speaker 2*a* is changed to the direction toward the vehicle (vehicle approaching the user) by an operation of the rotary mechanism. The LED light 2*b* emits light toward the outside. The LED light 2*b* emits light to the vehicle approaching the user as necessary by illumination (or blinking). For example, the LED light 2*b* includes a driving unit for changing the light emitting direction, and emits light in a specific direction (direction toward the vehicle approaching the user). The operation of emitting the alert sound or light is hereinafter referred to as "user presence notification operation".

As shown in FIG. 9, the control device 70 includes a notification control unit 74 as a functional unit implemented by the control program in addition to the functional units described above. When the press signal is transmitted from any of the first to third switches S1, S2, and S3, the notification control unit 74 generates alert sound emission command information to be transmitted to the speaker 2*a* and light emission command information to be transmitted to the LED light 2*b*. These pieces of command information are transmitted from the information transmitting unit 73 toward the speaker 2*a* and the LED light 2*b*. Thus, the speaker 2*a* emits the alert sound in the direction toward the vehicle approaching the user. The LED light 2*b* emits light in the direction toward the vehicle approaching the user.

Thus, even if the user becomes unable to recognize the presence of the vehicle, the user presses any of the switches S1, S2, and S3 to emit the alert sound or light toward the vehicle, thereby notifying the vehicle about the presence of the user (visually impaired person). Accordingly, the driver of the vehicle can notice the presence of the user. With such a configuration, a notifier according to the present disclosure (notifier configured to identify the approaching vehicle based on the switch that has issued the press signal and perform the user presence notification operation for the vehicle) is constituted by the notification control unit 74, the speaker 2*a*, and the LED light 2*b*.

Figure 10:
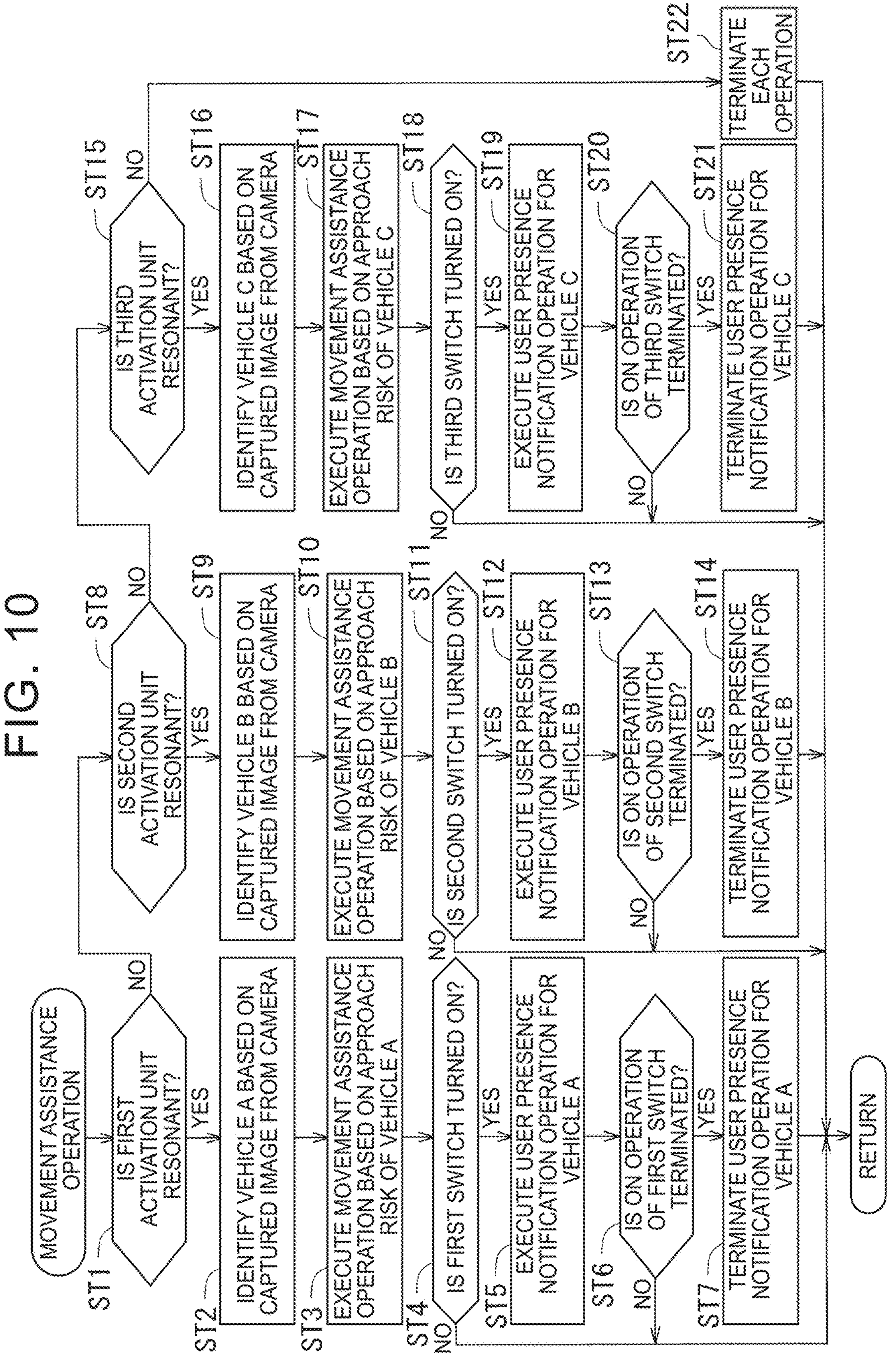
FIG. 10 is a flowchart showing a procedure of a movement assistance operation in the fourth embodiment.

FIG. 10 is a flowchart showing a procedure of the movement assistance operation in the present embodiment. The operation in this flowchart is repeated at predetermined time intervals during the movement of the user gripping the white cane 1. In this flowchart, the vehicle emitting the approach notification sound is referred to as "vehicle A", the emergency vehicle emitting the siren sound is referred to as "vehicle B", and the train is referred to as "vehicle C".

In Step ST1, determination is first made as to whether the first activation unit 60A is resonant (the spring mass system of the first activation unit 60A resonates with the approach notification sound from the vehicle).

When the determination is "YES" in Step ST1 because the first activation unit 60A is resonant, the process proceeds to Step ST2. The camera 20 is activated along with the activation of the movement assistance apparatus 10 along with the resonance, and the position of the vehicle A (vehicle emitting the approach notification sound) is determined based on a captured image acquired by the camera 20.

Then, the movement assistance operation is executed based on an approach risk of the vehicle A. For example, as described above, the user U is notified for caution by giving the voice or sound notification from the speaker mounted on the white cane 1 or by generating vibration with the individual vibration generator. For example, the user U is cautioned by giving the voice or sound notification when the distance between the position of the vehicle A determined based on the captured image acquired by the camera 20 and the position of the user U is equal to or smaller than a predetermined distance and the approach risk is relatively high. The user U is cautioned by generating vibration with the vibration generator when the distance between the position of the vehicle A and the position of the user U is larger than the predetermined distance and the approach risk is relatively low. The execution of the movement assistance operation based on the approach risk is not limited to the above example.

Then, the process proceeds to Step ST4. Determination is made as to whether the first switch S1 is turned ON (pressed). That is, determination is made as to whether the first switch S1 is turned ON because the user is unable to recognize the presence of the vehicle A. This determination is made based on whether the press signal is transmitted from the first switch S1.

When the determination is "NO" in Step ST4 because the first switch S1 is not turned ON, the process is returned and the movement assistance operation is continued.

When the determination is "YES" in Step ST4 because the first switch S1 is turned ON, the process proceeds to Step ST5. The user presence notification operation is executed for the vehicle A. In this case, the position of the vehicle A (vehicle emitting the approach notification sound) is determined based on the captured image acquired by the camera 20 (Step ST2), and the direction in which the vehicle A is present with respect to the white cane 1 is also determined. Therefore, the alert sound is emitted from the speaker 2*a* toward the vehicle A, and light is emitted from the LED light 2*b* toward the vehicle.

In the situation in which the user presence notification operation is being executed, determination is made in Step ST6 as to whether the ON operation of the first switch S1 is terminated. That is, determination is made as to whether the ON operation of the first switch S1 is terminated because the user becomes able to recognize the presence of the vehicle again.

When the determination is "NO" in Step ST6 because the ON operation of the first switch S1 is not terminated, the user presence notification operation is continued. When the determination is "YES" in Step ST6 because the ON operation of the first switch S1 is terminated, the process proceeds to Step ST7. The user presence notification operation for the vehicle A is terminated and the process is returned.

When the determination is "NO" in Step ST1 because the first activation unit 60A is not resonant, the process proceeds to Step ST8. Determination is made as to whether the second activation unit 60B is resonant (the spring mass system of the second activation unit 60B resonates with the siren sound from the emergency vehicle).

When the determination is "YES" in Step ST8 because the second activation unit 60B is resonant, the process proceeds to Step ST9. Processing operations in Steps ST9 to ST14 described below correspond to the processing operations in Steps ST2 to ST7 described above, respectively. That is, in Step ST9, the camera 20 is activated and the position of the vehicle B (emergency vehicle emitting the siren sound) is determined based on a captured image. In Step ST10, the movement assistance operation is executed based on an approach risk of the vehicle B.

In Step ST11, determination is made as to whether the second switch S2 is turned ON. That is, determination is made as to whether the second switch S2 is turned ON because the user is unable to recognize the presence of the vehicle B. When the second switch S2 is turned ON, the process proceeds to Step ST12. The user presence notification operation is executed for the vehicle B. In this case as well, the position of the vehicle B (emergency vehicle emitting the siren sound) is determined based on the captured image acquired by the camera 20 (Step ST9), and the direction in which the vehicle B is present with respect to the white cane 1 is also determined. Therefore, the alert sound is emitted from the speaker 2*a* toward the vehicle B, and light is emitted from the LED light 2*b* toward the vehicle B.

In Step ST13, determination is made as to whether the ON operation of the second switch S2 is terminated. When the ON operation of the second switch S2 is terminated, the user presence notification operation for the vehicle B is terminated in Step ST14 and the process is returned.

When the determination is "NO" in Step ST8 because the second activation unit 60B is not resonant, the process proceeds to Step ST15. Determination is made as to whether the third activation unit 60C is resonant (the spring mass system of the third activation unit 60C resonates with the traveling sound from the train).

When the determination is "YES" in Step ST15 because the third activation unit 60C is resonant, the process proceeds to Step ST16. Processing operations in Steps ST16 to ST21 described below also correspond to the processing operations in Steps ST2 to ST7 described above, respectively. That is, in Step ST16, the camera 20 is activated and the position of the vehicle C (train) is determined based on a captured image. In Step ST17, the movement assistance operation is executed based on an approach risk of the vehicle C.

In Step ST18, determination is made as to whether the third switch S3 is turned ON. That is, determination is made as to whether the third switch S3 is turned ON because the user is unable to recognize the presence of the vehicle C. When the third switch S3 is turned ON, the process proceeds to Step ST19. The user presence notification operation is executed for the vehicle C. In this case as well, the position of the vehicle C (train) is determined based on the captured image acquired by the camera 20 (Step ST16), and the direction in which the vehicle C is present with respect to the white cane 1 is also determined. Therefore, the alert sound is emitted from the speaker 2*a* toward the vehicle C, and light is emitted from the LED light 2*b* toward the vehicle C.

In Step ST20, determination is made as to whether the ON operation of the third switch S3 is terminated. When the ON operation of the third switch S3 is terminated, the user presence notification operation for the vehicle C is terminated in Step ST21 and the process is returned.

When the determination is "NO" in Step ST15 because the third activation unit 60C is not resonant, none of the activation units 60A, 60B, and 60C is resonant or the resonance is terminated. Therefore, the process proceeds to Step ST22. When any of the movement assistance operations described above has been performed, the movement assistance operation is terminated. When any of the user presence notification operations described above has been performed, the user presence notification operation is terminated and the process is returned.

The above operation is repeated during the movement of the user gripping the white cane 1.

In the present embodiment, when the user who grasped that the vehicle was approaching the user by the resonance of any of the activation units 60A, 60B, and 60C becomes unable to grasp the vehicle for some reason, the vehicle that cannot be grasped by the user is identified by pressing any of the switches S1, S2, and S3 arranged in association with the arrangement position of the resonating activation unit 60A, 60B, or 60C, and the user presence notification operation (notification operation for notifying the vehicle about the presence of the user) is performed for the vehicle. Therefore, the driver of the vehicle approaching the user grasps the presence of the user. Thus, the driver can be expected to perform a driving operation in consideration of the presence of the user. As a result, contact between the user and the vehicle can be avoided.

In the present embodiment, the functional units for directing the speaker 2*a* and the LED light 2*b* toward the vehicle are provided. Alternatively, a voice or sound instruction may be given from the speaker 2*a* or an individual speaker toward the user to change the direction to the direction of the approaching vehicle, and the white cane 1 (speaker 2*a* and LED light 2*b*) may be directed to the vehicle when the user changes the direction in response to the voice or sound instruction.

Fifth Embodiment

Next, a fifth embodiment will be described. In the fourth embodiment described above, the alert sound is emitted from the speaker 2*a* and the light is emitted from the LED light 2*b* toward the approaching vehicle as the user presence notification operation. Instead of the above, in the present embodiment, the driver of the vehicle grasps the presence of the user by using an information providing device in the vehicle (for example, a navigation system) through the communication between the movement assistance apparatus 10 and the vehicle V. The difference from the fourth embodiment described above will mainly be described.

Figure 11:
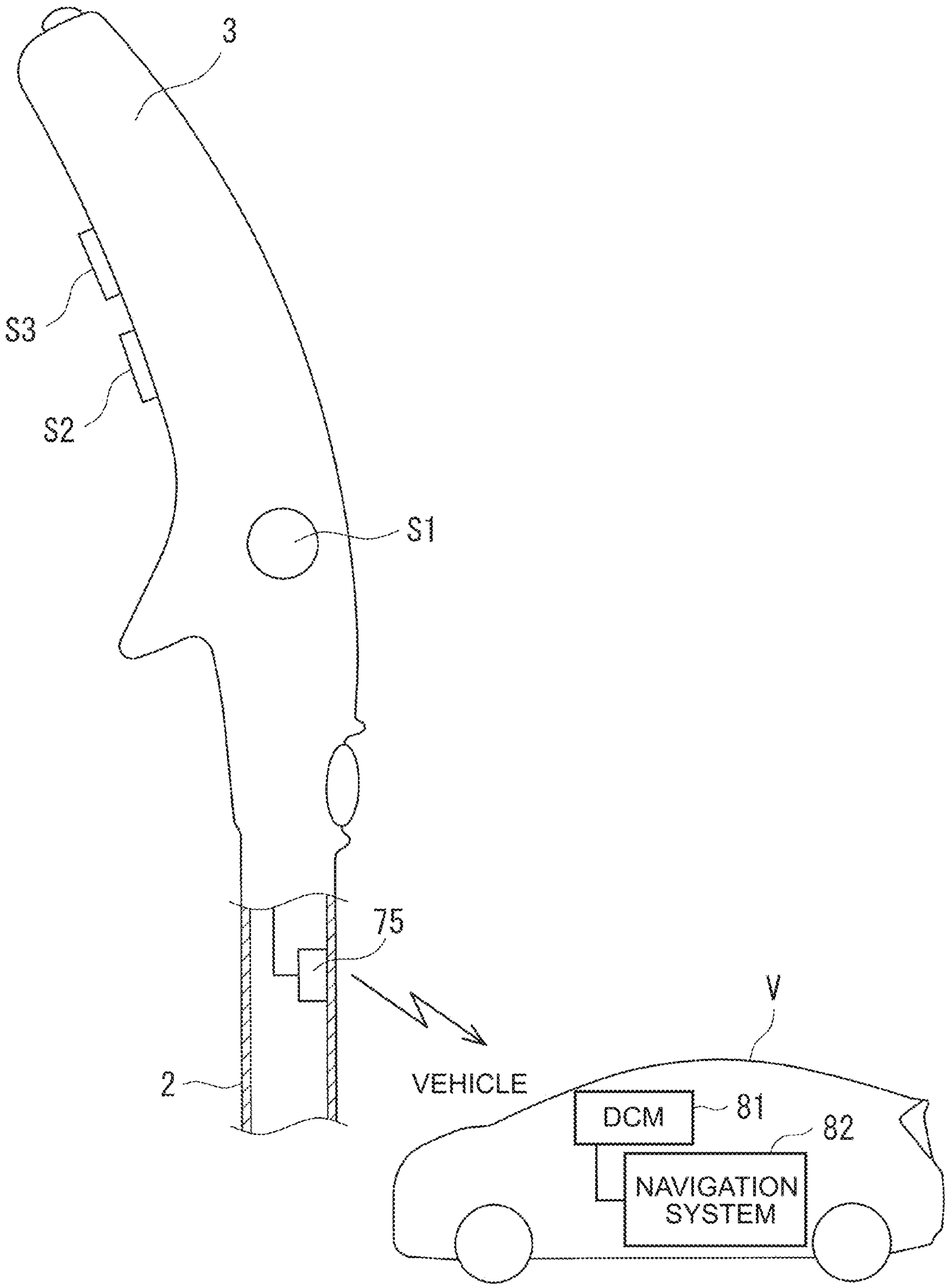
FIG. 11 is a diagram illustrating a state of communication between a white cane and a vehicle according to a fifth embodiment.
Figure 12:
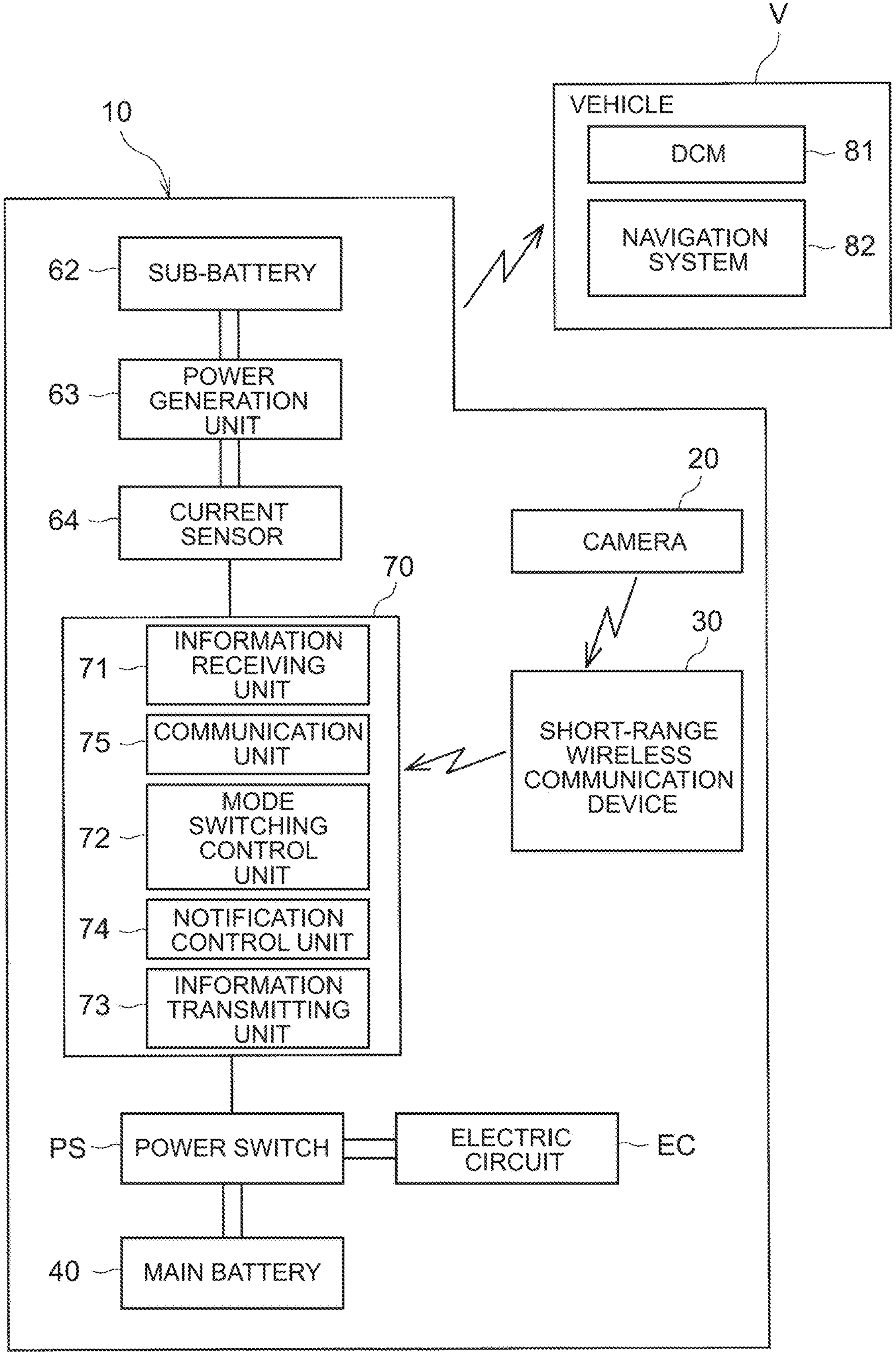
FIG. 12 is a block diagram showing schematic configurations of a control system of a movement assistance apparatus and a control system of the vehicle according to the fifth embodiment.

FIG. 11 is a diagram illustrating a state of communication between the white cane 1 and the vehicle V according to the present embodiment. FIG. 12 is a block diagram showing schematic configurations of a control system of the movement assistance apparatus 10 and a control system of the vehicle V according to the present embodiment.

As shown in FIG. 11, the shaft portion 2 of the white cane 1 in the present embodiment includes a communication unit 75 capable of communicating with a data communication module (DCM) 81 serving as a wireless communication device mounted on the vehicle V.

The DCM 81 is capable of two-way communication with a navigation system 82 mounted on the vehicle V through an in-vehicle network.

When the press signal is transmitted from any of the first to third switches S1, S2, and S3 (see FIG. 11), the notification control unit 74 provided in the control device 70 in the present embodiment identifies a vehicle (for example, determines identification (ID) information of the vehicle) emitting a sound resonating with the activation unit 60A, 60B, or 60C arranged at a position corresponding to the switch (activation unit resonating with the sound emitted by the vehicle), and generates user presence notification information to be transmitted toward the vehicle via the communication unit 75. The user presence notification information is transmitted from the notification control unit 74 to the DCM 81 of the vehicle V via the communication unit 75. Two-way communication is performed between the communication unit 75 and the DCM 81 through a predetermined network including the Internet or a mobile phone network having a large number of base stations to transmit and receive the ID information (individual information) of the vehicle V and the user presence notification information.

In the present embodiment as well, when the user who grasped that the vehicle was approaching the user by the resonance of any of the activation units 60A, 60B, and 60C becomes unable to grasp the vehicle for some reason, the user presses any of the switches S1, S2, and S3 arranged in association with the arrangement position of the resonating activation unit 60A, 60B, or 60C. In the present embodiment, when the press signal is transmitted from any of the first to third switches S1, S2, and S3, the user presence notification information is generated and transmitted to the DCM 81 of the vehicle V via the communication unit 75. The information received by the DCM 81 is transmitted to the navigation system 82, and a voice or sound indicating the presence of a pedestrian (user) ahead of the vehicle is emitted from a speaker of the navigation system 82 toward the driver. When user's position information is included as the user presence notification information, the user's position can be displayed on a display screen of the navigation system 82 (on a map in the display screen).

Thus, even if the user becomes unable to recognize the presence of the vehicle, the user presence notification information is transmitted to the vehicle, and the vehicle is notified about the presence of the user by using the navigation system 82. Accordingly, the driver of the vehicle can notice the presence of the user. With such a configuration, a notification device according to the present disclosure (notification device configured to identify the approaching vehicle based on the switch that has issued the press signal and perform the user presence notification operation for the vehicle) is constituted by the notification control unit 74 and the communication unit 75.

Sixth Embodiment

Next, a sixth embodiment will be described. In each of the embodiments described above, determination is made about the magnitude of the surrounding risk on the movement of the user based on whether the activation unit 60 is resonant (determination is made that the surrounding risk is low in an unresonant state and that the surrounding risk is high in a resonant state). Instead of the above, in the present embodiment, determination is made about the magnitude of the surrounding risk based on information on an image from the camera 20 (user's periphery information acquired by an information acquirer according to the present disclosure). That is, in the power saving mode of the present embodiment, only the camera 20, a communication system for transmitting and receiving the information on the image from the camera 20, and a processing system for processing the information are operated by being supplied with electric power, and the other devices are not supplied with electric power (power saving mode in which the power consumption is smaller than that in the normal mode according to the present disclosure). In the normal mode, electric power is supplied to all the devices.

In each of the embodiments described above, the vibration generated along with the resonance of the activation unit 60 is transmitted to the grip portion 3 of the white cane 1. Therefore, the vibration is transmitted to the user's hand to give caution to the user. Instead of the above, in the present embodiment, a dedicated vibration generator is built in the grip portion 3 of the white cane 1. Therefore, the activation unit 60 can be arranged at a portion other than the grip portion 3. In the present embodiment, the vibration pattern of the vibration generator is changeable depending on the surrounding risk (urgency level and importance level described later that serve as indices of the surrounding risk). Detailed description will be given below.

Figure 13:
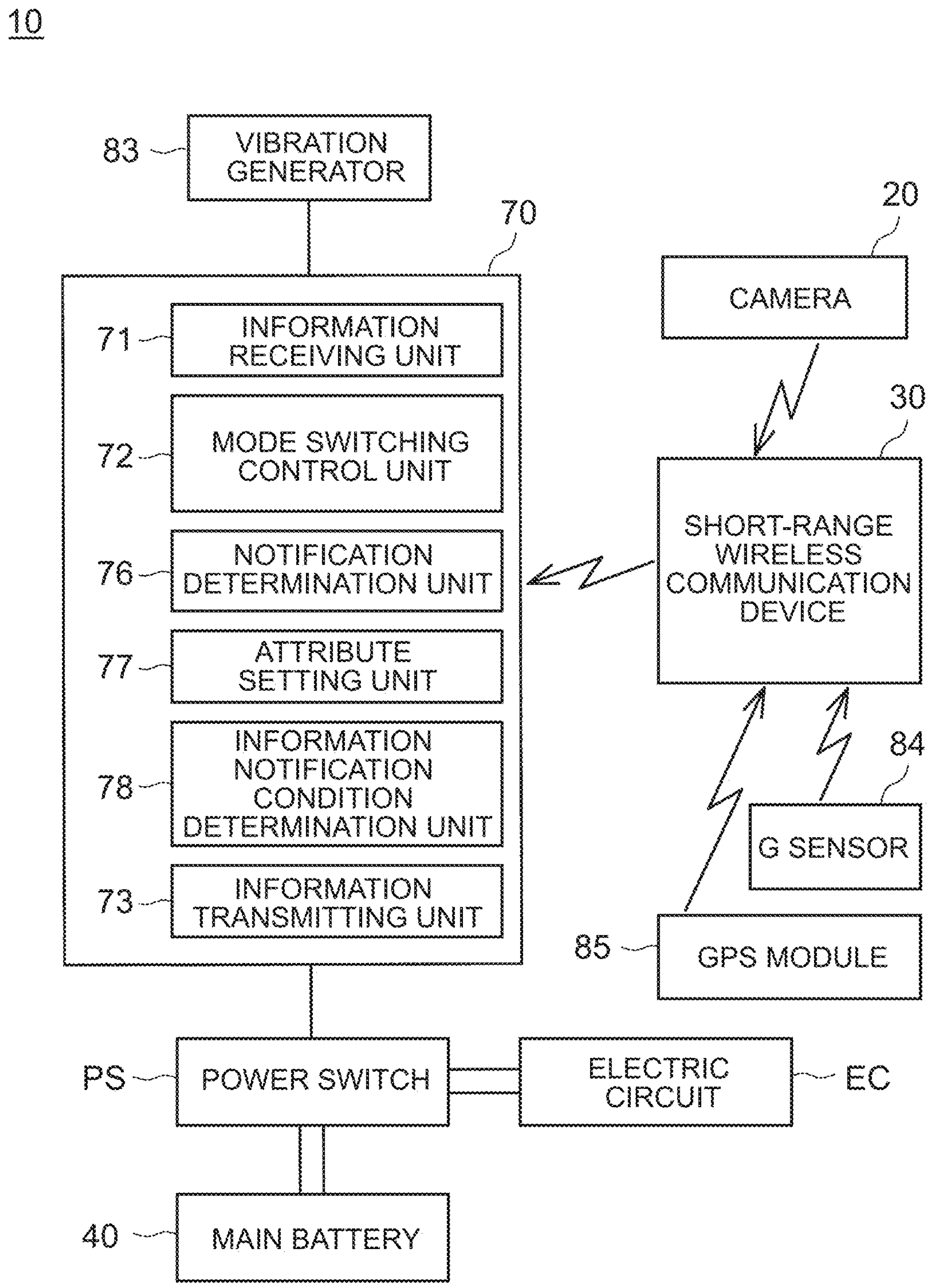
FIG. 13 is a block diagram showing a schematic configuration of a control system of a movement assistance apparatus according to a sixth embodiment.

FIG. 13 is a block diagram showing a schematic configuration of a control system of the movement assistance apparatus 10 according to the present embodiment. As shown in FIG. 13, a vibration generator 83 is connected to the control device 70. The vibration generator 83 is built in the grip portion 3 of the white cane 1. The vibration generator 83 vibrates along with an operation of a built-in motor. By transmitting the vibration to the grip portion 3, various notifications can be given to the user gripping the grip portion 3. As in the third embodiment described above, the vibration generator 83 may be arranged at a plurality of positions in the grip portion 3. A specific example of the notification to the user by the vibration of the vibration generator 83 will be described later.

The white cane 1 in the present embodiment includes a G sensor 84 for determining a moving speed and a moving acceleration of the user, and a global positioning system (GPS) module 85 for determining position information of the user. The control device 70 includes a notification determination unit 76, an attribute setting unit 77, and an information notification condition determination unit 78.

The notification determination unit 76 receives pieces of information received by the information receiving unit 71 (information on an image captured by the camera 20, information on an acceleration from the G sensor 84, and position information of the user from the GPS module 85), and determines whether information on the movement to be reported to the user is present based on these pieces of information.

Examples of the information on the movement to be reported to the user include information indicating that the user is approaching a crosswalk, information indicating that traffic lights are switched from red to green, information indicating that the user has crossed a crosswalk, information indicating that an obstacle that may hinder the movement is relatively approaching the user, information indicating that the movement needs to be stopped urgently (information provided when a vehicle is approaching the user), and information indicating that the user may deviate rightward or leftward from a crosswalk while crossing the crosswalk. The information on the movement to be reported to the user is not limited to these pieces of information.

The presence of a crosswalk, the completion of crossing of a crosswalk, and a possibility of deviating rightward or leftward from a crosswalk while crossing the crosswalk are recognized based on the information on the image captured by the camera 20. The recognition may be performed by referring to the position information of the user from the GPS module 85 and prestored map information. The traffic lights and the relative approach of an obstacle that may hinder the movement are recognized based on the information on the image captured by the camera 20. When the obstacle is a fixed object (object that does not move), the relative approach of the obstacle may be recognized by referring to the position information of the user from the GPS module 85 and the prestored map information.

When the notification determination unit 76 determines that the information on the movement to be reported to the user is present, the notification determination unit 76 outputs the information to the attribute setting unit 77.

When information indicating that the information on the movement to be reported to the user is present is received from the notification determination unit 76, the attribute setting unit 77 determines an attribute of the information on the movement to be reported. The attribute of the information is determined based on an urgency level and an importance level of the surrounding risk during the movement of the user. The urgency level is a level that is based on a physical period that elapses before the moving user faces the surrounding risk (danger). The phrase "facing the surrounding risk" herein refers to a situation in which the moving user comes into contact with an obstacle or the like (for example, a situation in which the moving user comes into contact with a vehicle) or a situation in which the user's movement condition is dangerous (for example, a situation in which the user moves into a roadway to cross a crosswalk while the traffic lights are red). That is, the urgency level increases as the physical period that elapses before the moving user faces the surrounding risk decreases. In other words, the urgency level can be determined as the reciprocal of a time margin for surrounding risk avoidance when the user faces the surrounding risk. In the following, the situation in which the user comes into contact with an obstacle (vehicle etc.) will mainly be described as an example of the case of facing the surrounding risk. For example, when the moving user relatively approaches an obstacle, the urgency level increases as the distance to the obstacle (period that elapses before contact with the obstacle) decreases. To determine this urgency level, the physical period that elapses before facing the surrounding risk is calculated based on the distance to the surrounding risk and the moving speed of the user. The distance to the surrounding risk is calculated based on the information on the image captured by the camera 20. The moving speed of the user is calculated based on the information from the G sensor 84. In the present embodiment, when the urgency level has reached a predetermined level, the power mode of the movement assistance apparatus 10 is switched from the power saving mode to the normal mode. That is, the magnitude of the surrounding risk correlates with the urgency level.

The importance level is a level of influence resulting from the event that the moving user faces the surrounding risk (danger). That is, the importance level increases as the size of an object that is the surrounding risk that the moving user faces increases, as the surface of the object is harder, and as the relative approach speed to the object increases. For example, when the moving user approaches a vehicle (or when a vehicle approaches the user), the importance level is higher than that in a case where the user relatively approaches a person. In the present embodiment, when the importance level has reached a predetermined level, the power mode of the movement assistance apparatus 10 is switched from the power saving mode to the normal mode. That is, the magnitude of the surrounding risk correlates with the importance level.

Figures 14, 15:
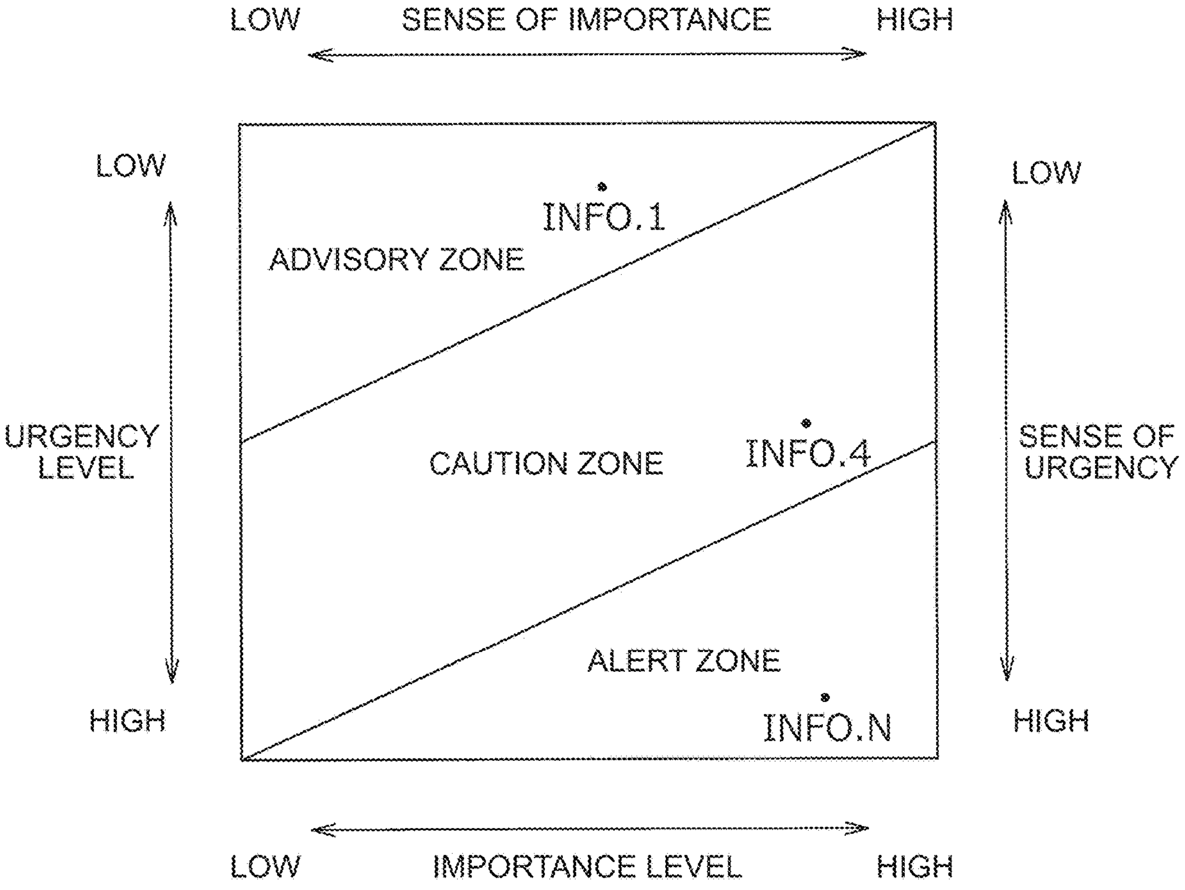
FIG. 14 is a diagram showing an information attribute table.
FIG. 15 is a diagram showing relationships among an urgency level and an importance level, a sense of urgency and a sense of importance, and information attribute zones.

FIG. 14 is a diagram showing an information attribute table. The information attribute table is prestored in the ROM of the control device 70. As shown in FIG. 14, in the present embodiment, information attributes (INFO. 1 to INFO. N) are set based on the urgency levels and the importance levels of the surrounding risk on the user's movement. The urgency level is divided into three patterns that are "low", "medium", and "high". The importance level is divided into two patterns that are "medium" and "high". The plurality of (for example, six) information attributes (INFO. 1 to INFO. N) is assigned based on the urgency levels and the importance levels.

When the moving user relatively approaches a vehicle, a wall, or the like, the urgency level increases as the period that elapses before collision decreases. That is, the urgency level changes in the order of "low", "medium", and "high" over time as the period that elapses before collision decreases. For example, the urgency level is "low" when the period that elapses before collision is 10 seconds to 6 seconds, "medium" when the period that elapses before collision is 6 seconds to 3 seconds, and "high" when the period that elapses before collision is shorter than 3 seconds. These values are not limited to the above, and may be set arbitrarily.

Even if the period that elapses before collision is the same, the urgency level varies depending on the characteristics of the user. For example, the urgency level is low for a user having a high agility of action (corresponding to an urgency level correction parameter according to the present disclosure) to avoid contact with an obstacle upon recognition of a possibility of the contact with the obstacle. The urgency level is high for a user having a low agility of action to avoid the contact with the obstacle (for example, an elderly person). For example, in the case of the user having a high agility of avoidance action, the urgency level changes in the order of "low", "medium", and "high" over time as the period that elapses before collision decreases (for example, the urgency level is "low" when the period that elapses before collision is 10 seconds to 6 seconds, "medium" when the period that elapses before collision is 6 seconds to 3 seconds, and "high" when the period that elapses before collision is shorter than 3 seconds as described above). In the case of the user having a low agility of avoidance action, the urgency level changes in the order of "medium" and "high" over time as the period that elapses before collision decreases (there is no state in which the urgency level is "low") even in the same situation. As an example of this case, the urgency level is "medium" when the period that elapses before collision is 10 seconds to 5 seconds, and "high" when the period that elapses before collision is shorter than 5 seconds. These values are not limited to the above, and may be set arbitrarily. In a case where the urgency level changes in the order of "low", "medium", and "high" even for the user having a low agility of avoidance action, the timing to set the urgency level to "low", the timing to switch the urgency level from "low" to "medium", and the timing to switch the urgency level from "medium" to "high" are earlier than those for the user having a high agility of avoidance action. For example, the urgency level is "low" when the period that elapses before collision is 15 seconds to 10 seconds, "medium" when the period that elapses before collision is 10 seconds to 5 seconds, and "high" when the period that elapses before collision is shorter than 5 seconds. These values are not limited to the above, and may be set arbitrarily. In the present embodiment, when the urgency level has reached, for example, "medium" or "high", the power mode of the movement assistance apparatus 10 is switched from the power saving mode to the normal mode. The urgency level correction parameter may be the ease of the user's avoidance action depending on the surrounding environment against the event that the user faces danger during the movement of the user (the size of the surrounding space for avoiding the contact with the obstacle that is determined based on the image captured by the camera 20; as the surrounding space is wider, the urgency level changes to the lower side by determining that the avoidance action is easier), or the type of danger during the movement of the user (the type of the obstacle that is determined based on the image captured by the camera 20; as the obstacle is smaller, the urgency level changes to the lower side by determining that the avoidance action is easier).

The importance level is also an index of the level of influence on the movement when the user comes into contact. For example, when the user relatively approaches an obstacle such as a vehicle or a wall, the importance level is high because of a high degree of influence on the movement when the user comes into contact. When the user relatively approaches another person, the importance level is medium because of a relatively low degree of influence on the movement when the user comes into contact (lower than in the case where the user comes into contact with a vehicle or a wall). The obstacle is recognized by known image matching, deep learning, or the like. In the present embodiment, when the importance level has reached, for example, "high", the power mode of the movement assistance apparatus 10 is switched from the power saving mode to the normal mode.

The urgency level and the importance level described above are set in advance (preset) by a designer of the movement assistance apparatus 10 or a setter of each type of information before the use of the white cane 1. That is, the information preset in the movement assistance apparatus 10 includes a relationship between the urgency level and the physical period that elapses before the user faces the surrounding risk, a relationship between the urgency level and the agility of action to avoid facing the surrounding risk by the user who uses the white cane 1, and a relationship between the importance level and the surrounding risk on the movement.

FIG. 15 is a diagram showing relationships among the urgency level and the importance level described above, a sense of urgency and a sense of importance, and information attribute zones. The sense of urgency represents a person's psychological sensation associated with the urgency level (corresponding to the magnitude of a sense of danger about contact with an obstacle or the like). The sense of importance represents a person's psychological sensation associated with the importance level (corresponding to the magnitude of a sense of fear under the assumption that the person comes into contact with an obstacle or the like). As is apparent from FIG. 15, the sense of urgency increases as the urgency level increases, and the sense of importance increases as the importance level increases. In the present embodiment, areas for assignment of the information attributes (INFO. 1 to INFO. N) (information attribute zones) include an advisory zone defined in an area in which both the sense of urgency and the sense of importance are relatively low, an alert zone defined in an area in which both the sense of urgency and the sense of importance are relatively high, and a caution zone defined in the other area (area in which both the sense of urgency and the sense of importance are medium). The information attributes (INFO. 1 to INFO. N) are assigned to the respective zones. In FIG. 15, for example, the information attribute INFO. 1 (the sense of urgency is low and the sense of importance is medium) is assigned to the advisory zone, the information attribute INFO. 4 (the sense of urgency is medium and the sense of importance is high) is assigned to the caution zone, and the information attribute INFO. N (the sense of urgency is high and the sense of importance is high) is assigned to the alert zone.

In the above description, the urgency level is varied depending on the characteristics of the user, but may simply be determined based only on the physical period that elapses before the user faces the risk instead of taking the characteristics of the user into consideration.

The information notification condition determination unit 78 determines a notification condition of the information on the movement to be reported to the user based on the attribute (information attribute) of the information on the movement to be reported that is determined by the attribute setting unit 77. Specifically, a vibration physical characteristic (vibration pattern) of the vibration generator 83 is determined based on the information attribute.

Figure 16:
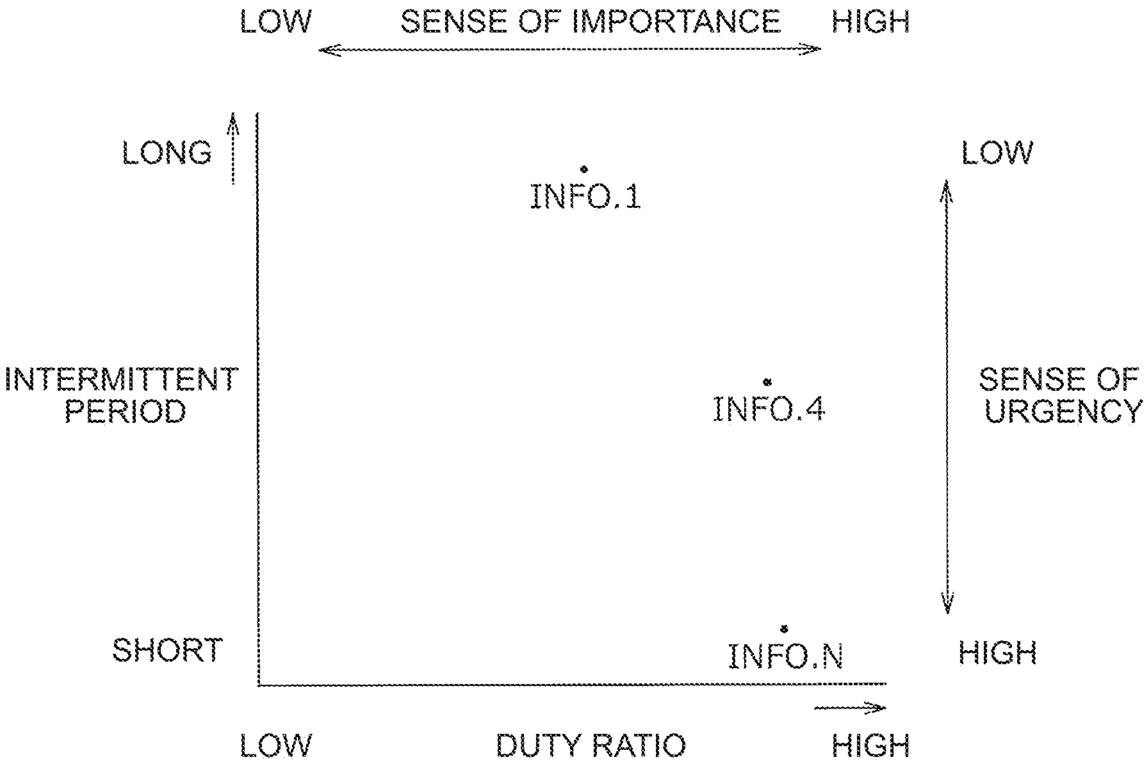
FIG. 16 is a diagram showing a vibration characteristic determination map.

FIG. 16 is a diagram showing a vibration characteristic determination map to be used to determine the vibration physical characteristic of the vibration generator 83. The vibration characteristic determination map is prestored in the ROM of the control device 70.

Specifically, a vibration ON period and a vibration OFF period are repeated as the vibration of the vibration generator 83. The vibration characteristic determination map is used to determine the sum of one vibration ON period and one vibration OFF period and the ratio of one vibration ON period to the sum of one vibration ON period and one vibration OFF period as the vibration physical characteristic of the vibration generator 83 for each of the information attributes (INFO. 1 to INFO. N). In the following description, the sum of one vibration ON period and one vibration OFF period is referred to as “intermittent period” of the vibration, and the ratio of one vibration ON period to the sum of one vibration ON period and one vibration OFF period is referred to as “duty ratio” of the vibration.

Figure 17A:
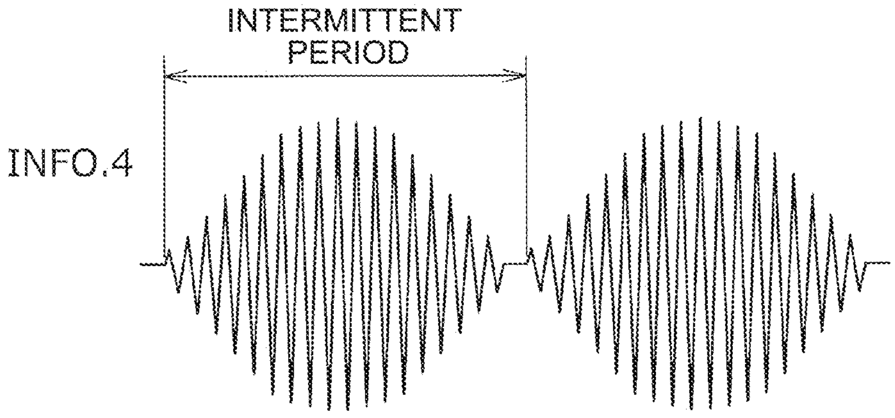
FIG. 17A is a waveform diagram showing an example of a vibration pattern assigned to an information attribute.
Figure 17B:
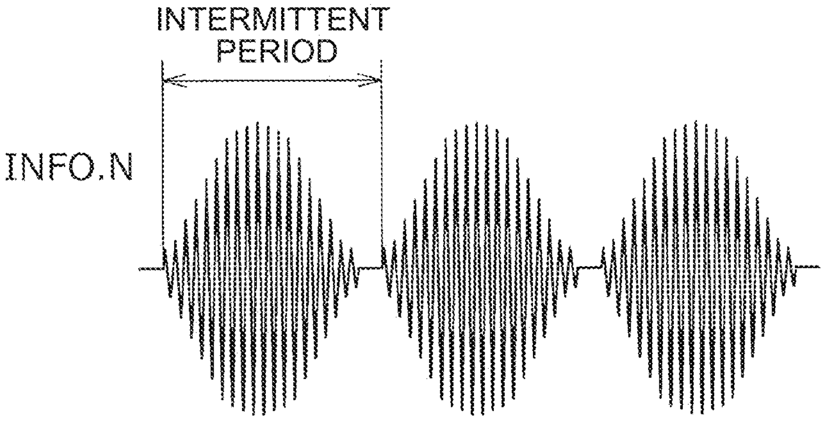
FIG. 17B is a waveform diagram showing an example of a vibration pattern assigned to an information attribute.

As illustrated above, in the case of the information attribute INFO. 1 (information attribute INFO. 1 having a low urgency level and a medium importance level and assigned to the advisory zone), the movement assistance apparatus 10 maintains the power saving mode, and therefore the vibration generator 83 does not vibrate. In the case of the information attribute INFO. 4 (information attribute INFO. 4 having a medium urgency level and a high importance level and assigned to the caution zone), the vibration of the vibration generator 83 is set to have a medium intermittent period and a high duty ratio. FIG. 17A is a waveform diagram showing a vibration pattern of the vibration generator 83 in this case. In the case of the information attribute INFO. N (information attribute INFO. N having a high urgency level and a high importance level and assigned to the alert zone), the vibration of the vibration generator 83 is set to have a short intermittent period and a high duty ratio. FIG. 17B is a waveform diagram showing a vibration pattern of the vibration generator 83 in this case. Although the description has been given of the vibration patterns of the two information attributes INFO. 4 and INFO. N, the intermittent period and the duty ratio are also set for each of the other information attributes.

As a tendency of the intermittent period and the duty ratio set in association with each of the information attributes, the intermittent period is set to decrease as the urgency level increases, and the duty ratio is set to increase as the importance level increases. In a situation in which the urgency level is high, the intermittent period is shortened to increase the number of repetitions of the vibration ON period and the vibration OFF period per unit time (see FIG. 17B). Thus, it is easier for the user to intuitively recognize the high urgency level through the notification. In the situation in which the importance level is high, the vibration ON period is set much longer than the vibration OFF period (see FIG. 17A). Thus, it is easier for the user to intuitively recognize the significant influence of the contact with the obstacle (significant damage) through the notification.

As described above, the power mode of the movement assistance apparatus 10 is switched based on the information acquired by the camera 20 or the like and, when determination is made that the information on the movement to be reported to the user is present in the normal mode, the attribute (information attribute) of the information on the movement to be reported is determined and the notification condition of the information on the movement to be reported to the user (vibration pattern of the vibration generator 83) is determined based on the attribute. Thus, it is possible to optimize the information to be provided to the user.

As described above, in the present embodiment, when both the urgency level and the importance level are low and the surrounding risk satisfies the low-risk condition, the power mode of the movement assistance apparatus 10 is the power saving mode. When the urgency level or the importance level increases and the surrounding risk does not satisfy the low-risk condition, the power mode of the movement assistance apparatus 10 is set to the normal mode and the movement assistance operation can be executed. In the present embodiment as well, the power mode is set to the normal mode as necessary so that the movement assistance operation can be executed, and the power mode is set to the power saving mode when the movement assistance operation is not necessary, thereby reducing the power consumption of the movement assistance apparatus 10.

The urgency level is determined by correcting, based on the urgency level correction parameter during the movement of the user, the reference urgency level associated with the physical period that elapses before the user faces danger during the movement. Therefore, it is possible to appropriately determine the urgency level depending on various situations during the movement of the user (such as the state of the user and the surrounding environment). Thus, it is possible to optimize the movement assistance operation to be provided to the user.

In the present embodiment, when determination is made that the information on the movement to be reported to the user is present based on the information acquired by means of the camera 20, the G sensor 84, the GPS module 85, or the like, the attribute of the information on the movement to be reported is determined based on the urgency level and the importance level, and the notification condition of the information on the movement to be reported to the user (vibration pattern of the vibration generator 83 of the white cane 1) is determined based on the attribute. Thus, it is possible to optimize the information to be provided to the user.

In the present embodiment, the vibration pattern of the vibration generator 83 may be set depending on the vehicle type and the approach direction of the vehicle approaching the user (the vibration generator 83 may be vibrated in different vibration patterns depending on the vehicle type and the approach direction of the vehicle).

In the present embodiment, a plurality of vibration generators 83 may be arranged inside the grip portion 3. In this case, as in the third embodiment described above, it is preferable that the vibration generators 83 be arranged in association with the positions of different fingers of the user, the type of the vehicle be determined based on an image captured by the camera 20, and one vibration generator 83 associated with the vehicle be vibrated. In this case as well, the user can know the type of the approaching vehicle by grasping which vibration generator 83 is vibrating while gripping the grip portion 3 of the white cane 1 as described above.

Seventh Embodiment

Next, a seventh embodiment will be described. The present embodiment provides a movement assistance system including the movement assistance apparatus 10 and a system management server. The power mode of the movement assistance apparatus 10 is switched between the normal mode and the power saving mode in response to a command signal from the system management server (information received from an external device according to the present disclosure).

Figure 18:
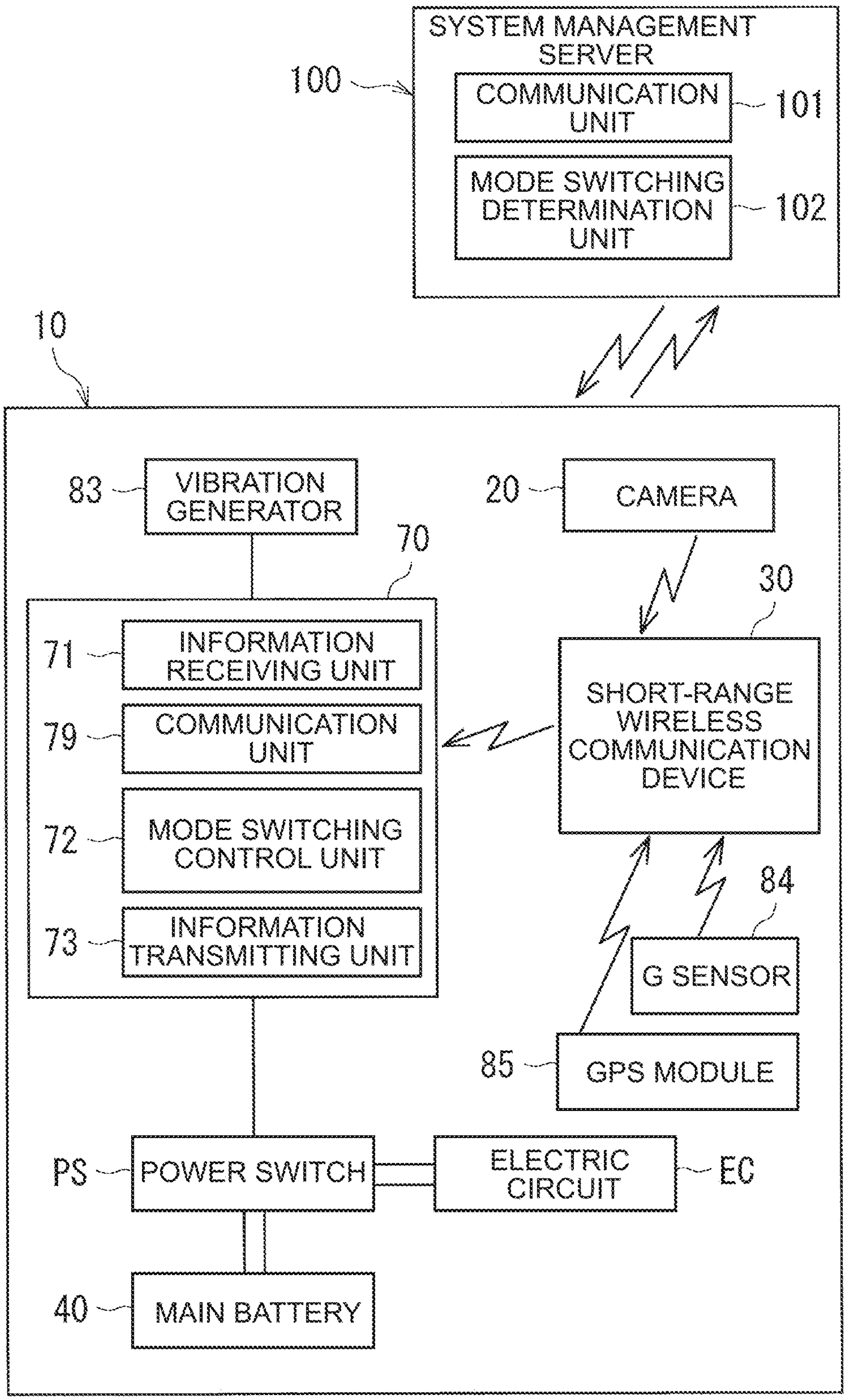
FIG. 18 is a block diagram showing a schematic configuration of a control system of a movement assistance system according to a seventh embodiment.

FIG. 18 is a block diagram showing a schematic configuration of a control system of the movement assistance system according to the present embodiment. As shown in FIG. 18, the movement assistance apparatus 10 and a system management server 100 include communication units 79 and 101 that enable transmission and reception of information therebetween, respectively.

The movement assistance apparatus 10 includes the vibration generator 83, the G sensor 84, and the GPS module 85 similarly to the movement assistance apparatus 10 according to the sixth embodiment described above (see FIG. 13). Acceleration information from the G sensor 84 and user's position information from the GPS module 85 are transmitted to the system management server 100 by the communication unit 79.

The system management server 100 includes a mode switching determination unit 102. The mode switching determination unit 102 determines whether to set the power mode of the movement assistance apparatus 10 to the normal mode or the power saving mode based on the pieces of information (acceleration information and user's position information) received from the movement assistance apparatus 10 by the communication unit 101. Specifically, the system management server 100 stores map information in a database (not shown), and an area where the movement assistance operation is necessary and an area where the movement assistance operation is unnecessary are preset in the map information. For example, an area around a crosswalk and an area around a road without a sidewalk are set as areas where the movement assistance operation is necessary, and the other areas are set as areas where the movement assistance operation is unnecessary. The conditions for setting these areas are not limited to those described above, and may be set arbitrarily.

The mode switching determination unit 102 determines, based on the pieces of information received from the movement assistance apparatus 10, whether the area where the user is currently moving is the area where the movement assistance operation is necessary or the area where the movement assistance operation is unnecessary. When the area is the area where the movement assistance operation is necessary, the mode switching determination unit 102 transmits switching command information for the normal mode from the communication unit 101 to the movement assistance apparatus 10. When the area where the user is currently moving is the area where the movement assistance operation is unnecessary, the mode switching determination unit 102 transmits switching command information for the power saving mode from the communication unit 101 to the movement assistance apparatus 10.

Based on the command information received from the system management server 100, the mode switching control unit 72 of the movement assistance apparatus 10 generates switching command information for switching the power mode of the movement assistance apparatus 10. That is, when the switching command information for the normal mode is received from the system management server 100, the movement assistance apparatus 10 enters the normal mode by turning ON the power switch PS. When the switching command information for the power saving mode is received from the system management server 100, the movement assistance apparatus 10 enters the power saving mode by turning OFF the power switch PS.

When the movement assistance apparatus 10 enters the normal mode, the movement assistance operation is performed to vibrate the vibration generator 83 based on the vehicle present in the surrounding image captured by the camera 20 (when the vehicle is approaching the user).

In the present embodiment, as in the embodiments described above, the power mode is set to the normal mode as necessary so that the movement assistance operation can be executed, and the power mode is set to the power saving mode when the movement assistance operation is not necessary, thereby reducing the power consumption of the movement assistance apparatus. As a result, the function of the movement assistance apparatus can be exerted continuously over a long period without the need to mount a large-size battery, thereby enhancing the practicality in the power saving of the movement assistance apparatus.

Eighth Embodiment

Next, an eighth embodiment will be described. In each of the embodiments described above, description has been given of the case where the movement assistance apparatus according to the present disclosure is built in the white cane 1 used by the user. Instead of the above, in the present embodiment, the movement assistance apparatus 10 is built in a grip portion of a personal mobility device. Detailed description will be given below.

Figure 19:
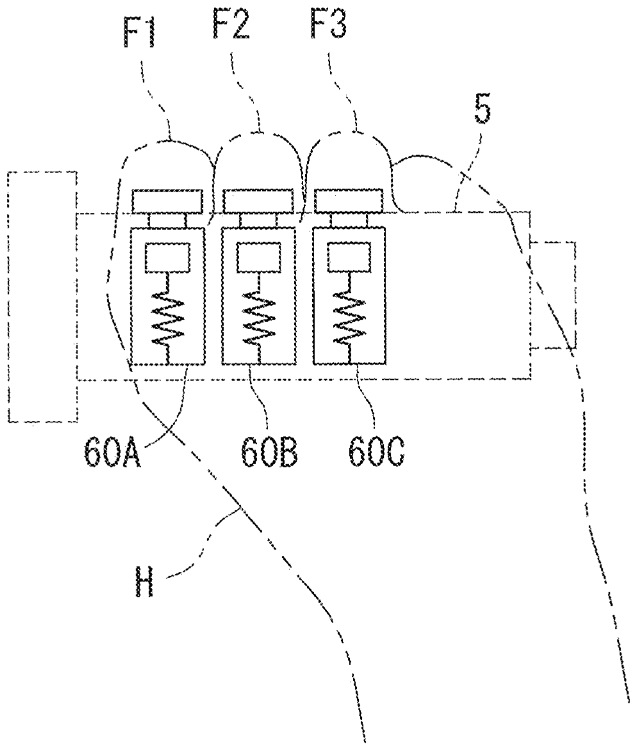
FIG. 19 is a diagram showing a state in which the user grips a grip portion of a personal mobility device according to an eighth embodiment.

FIG. 19 is a diagram showing a state in which the user grips a grip portion 5 of the personal mobility device according to the present embodiment. In FIG. 19, the grip portion 5 of the personal mobility device is represented by dashed lines, and the user's hand H (hand gripping the grip portion 5) is represented by long dashed double-short dashed lines.

In the present embodiment, the activation units 60A, 60B, and 60C are arranged inside the grip portion 5 as in the third embodiment described above.

The activation units 60A, 60B, and 60C are the first activation unit 60A arranged at a position corresponding to the thumb and the index finger F1 of the hand H of the user gripping the grip portion 5 (position corresponding to a contact area where the thumb and the index finger F1 are in contact with the surface of the grip portion 5), the second activation unit 60B arranged at a position corresponding to the middle finger F2 of the user's hand H (position corresponding to a contact area where the middle finger F2 is in contact with the surface of the grip portion 5), and the third activation unit 60C arranged at a position corresponding to the ring finger F3 of the user's hand (position corresponding to a contact area where the ring finger F3 is in contact with the surface of the grip portion 5).

In the present embodiment as well, the resonance frequencies (natural frequencies) of the spring mass systems (see FIG. 4) of the activation units 60A, 60B, and 60C are different from each other. The resonance frequencies of the spring mass systems of the activation units 60A, 60B, and 60C are the same as those in the third embodiment described above, and therefore the description thereof will be omitted.

The other configuration and the operation of switching the power mode of the movement assistance apparatus 10 are the same as those in the third embodiment described above.

Therefore, in the present embodiment as well, it is possible to attain the same effects as those in the third embodiment. That is, the user riding on the personal mobility device recognizes in advance the relationships among the arrangement positions of the activation units 60A, 60B, and 60C, the sounds that resonate with the activation units 60A, 60B, and 60C (approach notification sound, siren sound, and traveling sound), and the types of the vehicles that emit the sounds, thereby grasping the resonating spring mass system of any one of the activation units 60A, 60B, and 60C while gripping the grip portion 5. Thus, the user can know the type of the approaching vehicle (type of vehicle associated with the resonating sound).

Other Embodiments

It should be noted that the present disclosure is not limited to each of the embodiments above, and all modifications and applications included in the scope of claims and a range equivalent to the scope of claims are possible.

For example, in the first to fifth embodiments and the eighth embodiment, the spring mass system of the activation unit 60 (60A, 60B, 60C) resonates with the sound emitted by the vehicle. The present disclosure is not limited to this configuration. A vibration film may be provided to resonate with the sound emitted by the vehicle. In this case, the resonance frequency can be adjusted by appropriately setting the thickness, material, and size of the vibration film. Therefore, the thickness, material, and size are set depending on the sound to be resonated.

In the third, fourth, and fifth embodiments, the activation units 60A, 60B, and 60C have the same configuration (same configuration with different resonance frequencies of the spring mass systems). The present disclosure is not limited to this configuration. The activation units 60A, 60B, and 60C may have different configurations, or at least one activation unit may have a different configuration from those of the other activation units. For example, the first activation unit 60A has the configuration shown in FIG. 4, the second activation unit 60B has the configuration shown in FIG. 6, and the third activation unit 60C has the configuration using the vibration film.

In each of the embodiments described above, the power mode of the movement assistance apparatus 10 is switched between the two modes that are the normal mode and the power saving mode. The present disclosure is not limited to this configuration. The power saving mode may include a stop mode in which none of the devices is supplied with electric power (sleep state according to the present disclosure), and a standby mode in which only a part of the devices (for example, the camera 20) is supplied with electric power. In this case, it is possible to arbitrarily set either the stop mode or the standby mode as the power mode in the case where the surrounding risk on the movement of the user satisfies the predetermined low-risk condition.

In each of the embodiments described above, in the normal mode, the movement assistance apparatus 10 is activated by the electric power stored in the main battery 40 to perform the movement assistance operation. The present disclosure is not limited to this configuration. The movement assistance apparatus 10 may be activated to perform the movement assistance operation by using electric power generated along with the resonance of the spring mass system of the activation unit 60 (60A, 60B, 60C). In this case, the main battery may be omitted.

In each of the embodiments described above, the power mode of the movement assistance apparatus 10 is set to the power saving mode only when the surrounding risk satisfies the predetermined low-risk condition. The present disclosure is not limited to this configuration. The power mode of the movement assistance apparatus 10 may be set to the power saving mode when the surrounding risk satisfies the predetermined low-risk condition and another condition is satisfied (AND condition). For example, a power saving mode switching permission switch may be provided on the white cane 1, and the power mode of the movement assistance apparatus 10 may be set to the power saving mode when the power saving mode switching permission switch is ON and the surrounding risk satisfies the predetermined low-risk condition.

In the present disclosure, the power mode may be switched based on position information of the white cane 1 by storing map information in the ROM (storage unit) of the control device 70 and presetting an area where the movement assistance operation is necessary and an area where the movement assistance operation is unnecessary in the map information. For example, an area around a crosswalk and an area around a road without a sidewalk are set as areas where the movement assistance operation is necessary, and the other areas are set as areas where the movement assistance operation is unnecessary. When determination is made, based on the position information of the white cane 1, that the user is moving in the area where the movement assistance operation is necessary, the power mode is switched from the power saving mode to the normal mode. In this case, it is preferable to switch the power mode by checking information on a current area around the user based on a trained model generated from information stored in the ROM on situations in which the movement assistance operation is necessary.

The present disclosure is applicable to a power-saved movement assistance apparatus capable of performing a movement assistance operation for assisting user's movement.

What is claimed is:

1. A movement assistance apparatus to be provided in a movement assistance device and configured to execute a movement assistance operation for assisting movement of a user, the movement assistance apparatus comprising a mode switching control unit configured to switch, based on a magnitude of a surrounding risk on the movement of the user, a power mode between a normal mode in which the movement assistance operation is executable and a power saving mode in which a power consumption is smaller than a power consumption in the normal mode, wherein a condition for setting the power mode to the power saving mode includes a condition that the surrounding risk satisfies a predetermined low-risk condition;

a risk index acquisition unit configured to acquire a risk index correlated to the magnitude of the surrounding risk on the movement of the user, wherein the surrounding risk satisfies the predetermined low-risk condition when the risk index acquired by the risk index acquisition unit is equal to or smaller than a predetermined threshold; and wherein: the surrounding risk is related to approaches of one or more vehicles to the user;

the risk index acquisition unit includes:

one or more resonance devices configured to resonate with sounds emitted by the one or more vehicles approaching the user;

one or more power generation devices configured to generate electric power along with resonances of the one or more resonance devices; and one or more detection devices configured to detect physical quantities related to power generations of the one or more power generation devices; and the surrounding risk satisfies the predetermined low-risk condition when each of the physical quantities detected by the one or more detection devices is equal to or smaller than a predetermined threshold.

2. The movement assistance apparatus according to claim 1, wherein the sounds emitted by the one or more vehicles include at least one of an approach notification sound, a siren sound of an emergency vehicle, or a traveling sound of a train.

3. The movement assistance apparatus according to claim 1, wherein a resonance frequency of each of the one or more resonance devices is set as a frequency higher than a frequency of the sound emitted by a corresponding one of the one or more vehicles by an amount corresponding to frequency shift due to a Doppler effect when the corresponding one of the one or more vehicles approaches the user.

4. The movement assistance apparatus according to claim 1, wherein: the movement assistance device includes a grip portion to be gripped by the user; and a plurality of the resonance devices is arranged at a plurality of positions in the grip portion, and resonance frequencies of the resonance devices are individually set based on frequencies of sounds of the vehicles that emit the sounds at different frequencies.

5. The movement assistance apparatus according to claim 4, wherein:

the grip portion of the movement assistance device includes a plurality of contact areas where fingers of a hand of the user come into contact; and the resonance devices are arranged at positions corresponding to the contact areas different from each other.

6. The movement assistance apparatus according to claim 4, further comprising:

a plurality of switches arranged in association with arrangement positions of the resonance devices and configured to be pressed by the user; and a notification device configured to receive a press signal from at least one of the switches pressed by the user, identify the one or more vehicles approaching the user based on the at least one of the switches that has issued the press signal, and perform a user presence notification operation for the one or more vehicles.

7. The movement assistance apparatus according to claim 1, wherein the mode switching control unit is configured to switch the power mode from the power saving mode to the normal mode when the risk index acquired by the risk index acquisition unit is larger than the predetermined threshold from a state in which the risk index is equal to or smaller than the predetermined threshold.

8. The movement assistance apparatus according to claim 1, wherein the magnitude of the surrounding risk on the movement of the user is correlated to an urgency level that is based on a physical period that elapses before the user faces danger during the movement of the user.

9. The movement assistance apparatus according to claim 8, wherein the urgency level is a level corrected, based on at least one of urgency level correction parameters during the movement of the user, from a reference urgency level associated with the physical period that elapses before the user faces the danger during the movement of the user.

10. The movement assistance apparatus according to claim 9, wherein the urgency level correction parameters include at least one of an agility of avoidance action of the user against an event that the user faces the danger during the movement of the user, an ease of avoidance action of the user depending on a surrounding environment against the event that the user faces the danger during the movement of the user, or a type of the danger during the movement of the user.

11. The movement assistance apparatus according to claim 1, wherein the magnitude of the surrounding risk on the movement of the user is correlated to an importance level that is a level of influence resulting from an event that the user faces danger during the movement of the user.

12. The movement assistance apparatus according to claim 1, wherein whether the surrounding risk satisfies the predetermined low-risk condition is determined based on at least one of user's periphery information acquired by an information acquisition device provided in the movement assistance apparatus, information received from an external device by the movement assistance apparatus, or position information of the movement assistance device.

13. The movement assistance apparatus according to claim 1, wherein the mode switching control unit is configured to switch the power mode from the power saving mode to the normal mode when the surrounding risk satisfies a predetermined high-risk condition from a state in which the surrounding risk satisfies the predetermined low-risk condition.

14. The movement assistance apparatus according to claim 1, wherein the movement assistance apparatus in the power saving mode is in a sleep state in which power supply to a device built in the movement assistance apparatus is stopped.

15. The movement assistance apparatus according to claim 1, further comprising a storage unit configured to store information on a situation in which the movement assistance operation is necessary, wherein the mode switching control unit is configured to switch the power mode to the normal mode when the user who is moving is in the situation stored in the storage unit in which the movement assistance operation is necessary.

16. The movement assistance apparatus according to claim 15, wherein the mode switching control unit is configured to switch the power mode by checking information on a current area around the user based on a trained model generated from the information stored in the storage unit on the situation in which the movement assistance operation is necessary.

17. The movement assistance apparatus according to claim 1, wherein the movement assistance device is gripped or carried by the user.

18. A movement assistance system comprising:

a movement assistance apparatus provided in a movement assistance device and configured to execute a movement assistance operation for assisting movement of a user, and switch a power mode between a normal mode in which the movement assistance operation is executable and a power saving mode in which a power consumption is smaller than a power consumption in the normal mode;

a communication unit provided in a system management server configured to transmit and receive information to and from the movement assistance apparatus, the communication unit being configured to transmit switching command information for the power saving mode to the movement assistance apparatus under satisfaction of a predetermined condition including a condition that a surrounding risk satisfies a predetermined low-risk condition;

a mode switching control unit provided in the movement assistance apparatus and configured to switch the power mode to the power saving mode when the switching command information is received from the communication unit; and a risk index acquisition unit configured to acquire a risk index correlated to the magnitude of the surrounding risk on the movement of the user, wherein the surrounding risk satisfies the predetermined low-risk condition when the risk index acquired by the risk index acquisition unit is equal to or smaller than a predetermined threshold; and wherein: the surrounding risk is related to approaches of one or more vehicles to the user;

the risk index acquisition unit includes:

one or more resonance devices configured to resonate with sounds emitted by the one or more vehicles approaching the user;

one or more power generation devices configured to generate electric power along with resonances of the one or more resonance devices; and one or more detection devices configured to detect physical quantities related to power generations of the one or more power generation devices; and the surrounding risk satisfies the predetermined low-risk condition when each of the physical quantities detected by the one or more detection devices is equal to or smaller than a predetermined threshold.

* * * * *